US010963464B2

(12) United States Patent
Eadon et al.

(10) Patent No.: US 10,963,464 B2
(45) Date of Patent: Mar. 30, 2021

(54) MULTIPLE PARTITIONING SCHEMES FOR PARTITIONED DATABASE OBJECTS

(71) Applicant: ORACLE INTERNATIONAL CORPORATION, Redwood Shores, CA (US)

(72) Inventors: George Eadon, Hollis, NH (US); Thomas Baby, Maple Valley, WA (US); Ramesh Kumar, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 200 days.

(21) Appl. No.: 16/163,198

(22) Filed: Oct. 17, 2018

(65) Prior Publication Data

US 2020/0125666 A1    Apr. 23, 2020

(51) Int. Cl.
*G06F 16/2455*   (2019.01)
*G06F 16/2453*   (2019.01)

(52) U.S. Cl.
CPC .. *G06F 16/24557* (2019.01); *G06F 16/24537* (2019.01)

(58) Field of Classification Search
CPC ............. G06F 16/24557; G06F 16/24537
USPC ........................................................ 707/715
See application file for complete search history.

(56) References Cited

U.S. PATENT DOCUMENTS

2017/0116278 A1*   4/2017   Baby ................... G06F 16/21

OTHER PUBLICATIONS

Chen, W. et al., "Database Partitioning, Table Partitioning, and MDC for DB2 9", IBM Redbooks, (Aug. 2007).
Baer, H., "Partitioning with Oracle Database 11g Release 2", Oracle White Paper, (Sep. 2009).
Baer, H., "Partitioning in Oracle Database 11g", Oracle White Paper, (Jun. 2007).
Zamanian, E. et al., "Locality-aware Partitioning in Parallel Database Systems", SIGMOD'15, (May 31-Jun. 4, 2015).
Cheung, A. et al., "Automatic Partitioning of Database Applications", Proceedings of the VLDB Endowment, vol. 5, No. 11, (Aug. 27-31, 2012).
Bertolucci, M. et al., "Static and Dynamic Big Data Partitioning on Apache Spark", Department of Computer Science, University of Pisa, Pisa, Italy, (Jul. 2015).
Zhou, J. et al., "Advanced Partitioning Techniques for Massively Distributed Computation", SIGMOD S12, (May 20-24, 2012).
Serafini, M. et al., "Clay: Fine-Grained Adaptive Partitioning for General Database Schemas", Proceedings of the VLDB Endowment, vol. 10, No. 4, (Nov. 2016).
Sun, L. et al., "Fine-grained Partitioning for Aggressive Data Skipping", SIGMOD' 14, (Jun. 22-27, 2014).
Nicoara, D. et al., "Hermes: Dynamic Partitioning for Distributed Social Network Graph Databases", Proceedings 18th International Conference on Extending Database Technology (EDBT), (Mar. 23-27, 2015).

(Continued)

*Primary Examiner* — Evan Aspinwall
(74) *Attorney, Agent, or Firm* — Vista IP Law Group, LLP

(57) ABSTRACT

Disclosed is a system, method, and computer program product that allows multiple partition schemes to be applied to a single object. Each scheme represents the same set of partitions, but the schemes may have different partition methods, different partition keys, and/or different partition bounds.

21 Claims, 31 Drawing Sheets

(56) References Cited

OTHER PUBLICATIONS

Lima, A. A. B. et al., "Adaptive Virtual Partitioning for OLAP Query Processing in a Database Cluster", Journal of Information and Data Management, vol. 1, No. 1, (Feb. 2010).
Huang, J. et al., "LEOPARD: Lightweight Edge-Oriented Partitioning and Replication for Dynamic Graphs", Proceedings of the VLDB Endowment, vol. 9, No. 7, (Mar. 2016).
Hershberger, J. et al., "Adaptive Spatial Partitioning for Multidimensional Data Streams", Algorithmica, (Sep. 2006).

* cited by examiner

| Name | Age |
|---|---|
| Archie | 22 |
| Betty | 21 |
| Jughead | 23 |
| Reggie | 22 |
| Veronica | 21 |

Fig. 3A

```
PARTITION BY LIST (Age)
(
    PARTITION P1
        VALUES (21),
    PARTITION P2
        VALUES (22),
    PARTITION P3
        VALUES (23)
);
```

Table T

| Name | Age | Age_Str |
|---|---|---|
| Archie | 22 | '22' |
| Betty | 21 | '21' |
| Jughead | 23 | '23' |
| Reggie | 22 | '22' |
| Veronica | 21 | '21' |

P1

| Name | Age | Age_Str |
|---|---|---|
| Betty | 21 | '21' |
| Veronica | 21 | '21' |

P2

| Name | Age | Age_Str |
|---|---|---|
| Archie | 22 | '22' |
| Reggie | 22 | '22' |

P3

| Name | Age | Age_Str |
|---|---|---|
| Jughead | 23 | '23' |

Fig. 3F

MULTIPLE PARTITIONING SCHEMES FOR PARTITIONED DATABASE OBJECTS

BACKGROUND

Many databases utilize partitioning to stored objects in the database system. Partitioning in a database system generally refers to the process of decomposing an object into a greater number of relatively smaller objects. Smaller objects are often easier to manage and more efficient to search than larger objects. Thus, database systems utilize partitioning to decompose objects such as tables and indexes into smaller and more manageable pieces or "partitions."

The specific manner in which partitioning is implemented is generally referred to as a "partition scheme". A partition scheme is described by (a) a partition method (e.g. RANGE, LIST, or HASH), (b) a partition key column, and (c) a set of partition bounds. It is this combination of a method, key, and bounds that defines a partition scheme. Therefore, modification of at least one of these items creates a distinct and separate partition scheme.

Several advantages exist once a data object has been partitioned. As just one example, "partition pruning" can be used to more efficiently execute a query upon a partitioned table. If a database query is issued against a table and the query contains a search term that is limited by a certain range or value corresponding to a partitioning criteria, then only partitions having the desired range or value are searched; all other partitions outside the desired range are "pruned" from the search. Compared to non-partitioned tables, partition pruning significantly reduces the volume of data that must be searched, thereby decreasing the response time and reducing the expense/overhead of responding to the query.

Conventionally, a database object typically has only a single type of partition scheme that is applied to partition that object, which means that the partitioned object has only one partition scheme that is used for performance optimizations such as partition pruning. If the predicate of a query has a condition which corresponds to the partitioning scheme, then it is possible that a database optimizer may identify one or more partitions that can be pruned to optimize the execution of the query.

The problem is that a query may be received which does not have a predicate that corresponds to the one partitioning scheme that was applied to the partitioned object. Even if some or all of the partitions do not usefully contain content that corresponds to the expected query result, they cannot be pruned. This is very inefficient since the computing system will need to load unneeded content and consume excess memory resources to hold the unnecessary content, as well using excess processor resources to process the unnecessary content.

What is needed, therefore, is a method and/or system that overcomes these problems, and which more efficiently implements partitioning in a database system.

SUMMARY

According to some embodiments, a system, method, and computer program product is provided that allows multiple partition schemes to be applied to a single object. Each scheme may represent the same set of partitions, but the schemes have different partition methods, different partition keys, and/or different partition bounds. This approach therefore significantly improves database performance by allowing partition-related performance optimizations to occur using multiple types of partition schemes.

Other additional objects, features, and advantages of the invention are described in the detailed description, figures, and claims.

BRIEF DESCRIPTION OF FIGURES

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIGS. 3A-3H provide an illustrative example of an approach to implement a partitioned database object and metadata describing the partition schemes according to some embodiments of the invention.

DETAILED DESCRIPTION

Various embodiments will now be described in detail, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Embodiments of the present invention provide a system, method, and computer program product that allows multiple partition schemes to be applied to a single database object. In some embodiments each scheme represents the same set of partitions, but the schemes may have different partition methods, different partition keys, and/or different partition bounds. This approach therefore significantly improves database performance by allowing partition-related performance optimizations to occur using multiple types of partition schemes.

Figure 1:
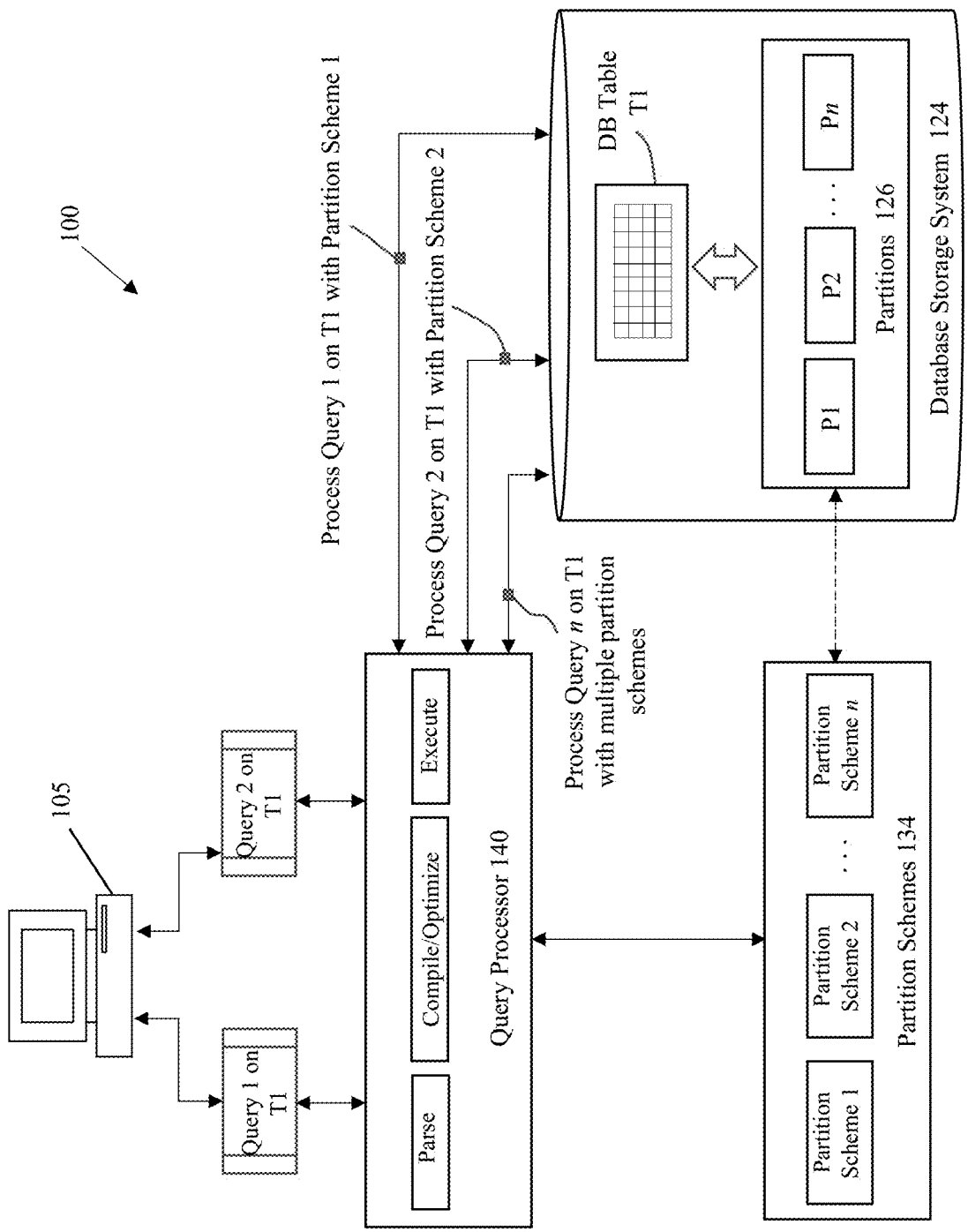
FIG. 1 illustrates a system for implementing some embodiments of the invention.

FIG. 1 illustrates a system 100 for implementing some embodiments of the invention. System 100 includes a database having one or more tables T1 that are operated upon by one or more clients within the system. One or more users at the clients operate a user station 105 to issue commands to be processed by the database upon the table T1. The user stations and/or the servers that host the database comprises any type of computing device that may be used to implement, operate, or interface with the database system 100. Examples of such devices include, for example, workstations, personal computers, mobile devices, servers, hosts, nodes, or remote computing terminals. The user station comprises a display device, such as a display monitor, for displaying a user interface to users at the user station. The user station also comprises one or more input devices for the user to provide operational control over the activities of the system 100, such as a mouse or keyboard to manipulate a pointing object in a graphical user interface to generate user inputs.

The table T1 may be stored as a set of partitions 126 within a database storage system 124. Partitioning allows database objects (e.g., tables, indexes, and index-organized tables) to be subdivided into smaller pieces, permitting these database objects to be managed and accessed at a finer level of granularity. As such, partitioning is used to enhance the performance, manageability, and availability of data within a database, and helps reduce the total cost of ownership for storing large amounts of data.

In the example of FIG. 1, the table T1 is subdivided into smaller pieces P1, P2, . . . Pn, where each piece of the database object is called a partition. Each partition has its own name, and may optionally have its own storage characteristics. From the perspective of a database administrator, a partitioned object has multiple pieces that can be managed either collectively or individually. This gives the administrator considerable flexibility in managing partitioned objects. However, from the perspective of the application, a partitioned table is identical to a non-partitioned table; no modifications are necessary when accessing a partitioned table using SQL queries and DML statements.

Any number of different partitioning methods may be applied to partition a database object/table, such as: (a) range partitioning, (b) hash partitioning, (c) list partitioning, or (d) reference partitioning. Each of these methods functions as a data distribution method that controls how data is placed into individual partitions, where each row in a partitioned table is unambiguously assigned to a single partition.

Range partitioning maps data to partitions based on ranges of values of the partitioning key that is established for each partition. This is a very common type of partitioning and is often used with dates. For example, for a table with a date column as the partitioning key, the "January-2018" partition would contain rows with partitioning key values from 1 Jan. 2018 to 31 Jan. 2018.

Hash Partitioning is used to map data to partitions based on a hashing algorithm that is applied to the partitioning key. If designed properly, the hashing algorithm evenly distributes rows among partitions, giving partitions approximately the same size. As such, this type of partitioning is a good method to distribute data evenly across storage/processing devices.

List partitioning permits explicit control over how rows are mapped to partitions by specifying a list of discrete values for the partitioning key in the description for each partition. The advantage of list partitioning is that this approach can group and organize unordered and unrelated sets of data.

The partitioning key is referenced by each of the partitioning methods, and is comprised of one or more columns that determine the partition where each row will be stored. The database will automatically directs insert, update, and delete operations to the appropriate partition through the use of the partitioning key.

The partition bounds specify values for the partition key which corresponds to how the rows are mapped to the different partitions. For example, for list partitioning, the bounds may one or more specific values that correlate to a given partition. As another example, with regards to range partitioning, each partition may have a "VALUES LESS THAN" clause, which specifies a non-inclusive upper partition bound for the partition. Any values of the partitioning key equal to or higher than this literal are added to a higher partition. There may be multiple higher partitions, and the value higher than PART1's bound may go into PART2 or PART3 or PARTn. All partitions, except the first, have an implicit lower partition bound specified by the "VALUES LESS THAN" clause of the previous partition. A "MAXVALUE" data item can be defined for the highest partition, with this data item representing a virtual infinite value that sorts higher than any other possible value for the partitioning key.

In some embodiments of the invention, a single database object (e.g., Table T1) may be associated with multiple distinct partition schemes 134. As previously noted, the specific manner in which partitioning is implemented is generally referred to as a partition scheme, where the partition scheme is described by a specific combination of (a) a partition method (e.g. RANGE, LIST, or HASH), (b) a partition key columns, and (c) a set of partition bounds. It is this combination of a method, key, and bounds that defines a partition scheme. Therefore, modification of at least one of these items creates a distinct and separate partition scheme. Here, a first combination of these elements corresponds to a first partition scheme, a second combination of these elements corresponds to a second partition scheme, and the nth combination of these elements corresponds to an nth partition scheme.

Interactions occur with a database by submission of commands that cause the database to perform operations on the database data. For the database server to process the commands, the commands typically conform to a database language supported by the database server. An example of a commonly used database language supported by many database servers is known as the Structured Query Language (SQL).

When a database server receives the original statement of a database command (e.g., from a database application), the database server must first determine which actions should be performed in response to the database command, and then perform those actions. A query processor 140 may process the database statement to prepare the acts necessary for performance of the desired actions within the database. The initial action to analyze and break the database statement into its constituent parts may be referred to as a "parsing" the database command. "Compilation" of the database command may then be performed to create the specific composition and sequence of actions to take against delineated set(s) of database objects, as well as code generation that may be necessary to create an executable version of the database statement. Since there may be multiple alternative processing paths that can be taken to achieve the same result within a database, "optimization" may be performed to identify specific processing paths that can be selected to improve the efficiency of processing for the database command. The actual performance of the actions applied to the database is generally referred to as "executing" the database command.

Partitioning can provide tremendous benefit to a wide variety of applications by improving performance, manageability, and availability. It is not unusual for partitioning to improve the performance of certain queries or maintenance operations by an order of magnitude. Moreover, partitioning can greatly simplify common administration tasks.

For example, partition pruning can be applied to provide substantial improvements to performance in a database system. If a database query is issued against a table and the query contains a search term that is limited by a certain range or value corresponding to a partitioning criteria, then only partitions having the desired range or value are searched; all other partitions outside the desired range are pruned from the search. Partition pruning can often improve query performance by several orders of magnitude. For example, suppose an application contains a table containing a historical record of orders, and that this table has been partitioned by week. A query requesting orders for a single week would only access a single partition of this orders table. If the orders table had 2 years of historical data, then this query would access one partition instead of 104 partitions, which could potentially allow the computing system to execute 100 times faster simply because of partition pruning.

Partitioning can also improve the performance of multi-table joins by using a technique known as partition-wise joins. Partition-wise joins can be applied when two tables are being joined together and both tables are partitioned on the join key, or when a reference partitioned table is joined with its parent table. Partition-wise joins break a large join into smaller joins that occur between each of the partitions, completing the overall join in less time. This offers significant performance benefits both for serial and parallel execution.

Partitioning also allows tables and indexes to be partitioned into smaller, more manageable units, providing database administrators with the ability to pursue a "divide and conquer" approach to data management. With partitioning, maintenance operations can be focused on particular portions of tables. For example, a database administrator could back up a single partition of a table, rather than backing up the entire table. For maintenance operations across an entire database object, it is possible to perform these operations on a per-partition basis, thus dividing the maintenance process into more manageable chunks. An example use of partitioning for manageability is to support a "rolling window" load process in a data warehouse. For example, consider if a DBA loads new data into a table on a weekly basis. That table could be partitioned so that each partition contains one week of data. The load process is simply the addition of a new partition using a partition exchange load, where adding the single partition is much more efficient than modifying the entire table, since the DBA does not need to modify any other partitions.

Partitioned database objects also provide partition independence. This characteristic of partition independence can be an important part of a high-availability strategy. For example, if one partition of a partitioned table is unavailable, then all of the other partitions of the table remain online and available. The application can continue to execute queries and transactions against the available partitions for the table, and these database operations will run successfully, provided they do not need to access the unavailable partition.

In many database systems, the database administrator can also specify that each partition be stored in a separate tablespace, where the tablespaces are stored on different storage tiers. Storing different partitions in different tablespaces allows the database administrator to perform backup and recovery operations on each individual partition, independent of the other partitions in the table. This allows the active parts of the database to be made available sooner so access to the system can continue, while the inactive data is still being restored. Moreover, partitioning can reduce scheduled downtime. The performance gains provided by partitioning may enable database administrators to complete maintenance operations on large database objects in relatively small batch windows.

With embodiments of the invention, the above optimizations and advantages may be multiplied and magnified in their application to a single database object, since they can be applied to multiple partition schemes relative to that single database object. In the example illustration of FIG. 1, consider if multiple queries are issued against table T1—Q1, Q2, through Qn. Each of these queries may seek to perform different database commands that refer to different columns within the predicate of the query.

With conventional database solutions that restrict a single database object to a single partition scheme, these different queries may only allow the specific query that matches to the single partition scheme to be optimized based upon the partitions (e.g., for partition pruning). This is highly inefficient, since the queries that do not match to that single partition scheme would not be able to take advantage of partition-based optimizations.

In sharp contrast, with embodiments of the current invention where a single database object may correspond to multiple partition schemes, this means that the different queries may match to any of one or more of the partition schemes, which permits a greater possibility that a given query may engage in partition-based optimizations. Here, query Q1 may have a predicate that matches with a first partitioning scheme, and thus may undergo partition-based optimization based upon that first partition scheme. A second query Q2 may have a predicate that matches with a second partitioning scheme, and undergo partition-based optimization based upon that second partition scheme. In some cases, a query Qn may match with multiple partitioning schemes, and undergo partition-based optimization based upon multiple partition schemes.

Figure 2:
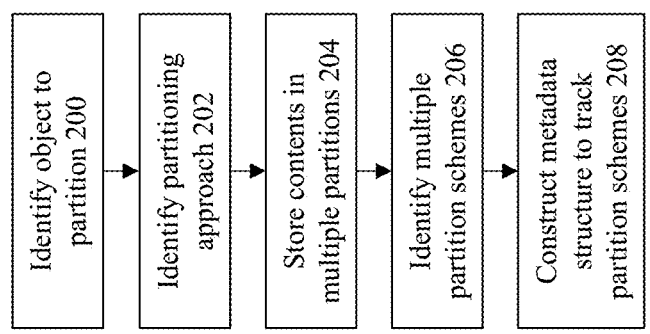
FIG. 2 shows a flowchart of an approach to implement a partitioned database object and metadata describing the partition schemes according to some embodiments of the invention.

FIG. 2 shows a flowchart of an approach to implement a partitioned database object and metadata describing the partition schemes according to some embodiments of the invention. At 200, the database object to partition is identified. The database object may correspond to any object that is suitable for partitioning within the database, e.g., a database table or index.

At 202, a base partitioning scheme may be identified for the database object. For example, a database statement may be received that provides the specific database commands for partitioning the database object, where the statement identifies both the specific object being partitioned, as well as the scheme for partitioning that object.

Multiple partitions may be created, pursuant to the database statement, to hold the contents of the database object. At 204, the contents of the database object are stored/mapped to the different partitions. For example, if a database table is being partitioned, each row of the table is placed into a corresponding partition that relates to that row. At 206, multiple partition schemes may be identified for the database object. This provides an additional one or more partition schemes, in addition to the base partition scheme, which defines partitions for the database object. As such, the database object may be associated with multiple combinations of a partition method, partition key column, and partition bounds.

At 208, a metadata structure is constructed that tracks the different partition schemes. In some embodiments, the metadata structure corresponds to a linked list of metadata objects, where each metadata object identifies a particular partition method, the partition key, and a list of pointers to the different partitions. Each metadata object in the linked list corresponds to a different partition scheme, where the linked list includes an entry for every partition scheme that is applicable to the partitioned database object.

The metadata can be stored on-disk, but then loaded into an in-memory structure that resides within a library cache. In certain circumstances, there may not be any on-disk metadata that is maintained, where the in-memory structure is instead constructed based on other metadata in the system. In an alternate embodiment, the metadata is persistently stored on-disk or constructed in-memory as the primary scheme is loaded from disk. In one embodiment, the database builds a library cache structure which includes (a) physical segment information, (b) a mapping from segment data object number to partition number, and (c) a mapping from partition key to partition number. The physical segment information and the mapping from segment data object number to partition number can be invariant with respect to the partition scheme, but it is possible that the mapping from partition key to partition number may depend on the partition scheme. This means that this structure may be extended to include a list of the previously discussed metadata structure, one for each of the object's partition schemes.

Figure 3B:
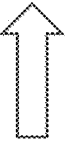

FIGS. 3A-3H provide an illustrative example of this process. FIG. 3A shows an example table which includes two columns. A first column is a "Name" column that includes a string/character value for a person's name. A second column is an "Age" column that includes a numeric value for the age of the person identified in the "Name" column.

As shown in FIG. 3B, assume that it is desired to construct another version of the table T that includes a third column, which is a virtual column. When queried, virtual columns appear to be normal table columns, but their values are derived rather than being stored on disc. Here, the virtual column "Age_str" corresponds to a string constructed from the contents of the number in the "Age" column. For example, in the row that has "Archie" in the "Name" column, the numeric value in the "Age" column for that row is 22. The contents of the virtual "Age_St" column for that row is '22', which is that numeric value 22 converted into a string.

Figure 3C:

Assume that the base partitioning for this table is shown in FIG. 3C. Here, the partitioning method is list partitioning, with the partitioning key being the "Age" column. The partition bounds identify partition P1 to hold all rows that have the value 21 in the "Age" column, partition P2 to hold all rows that have the value 22 in the "Age" column, and partition P3 to hold all rows that have the value 23 in the "Age" column.

Figure 3D:
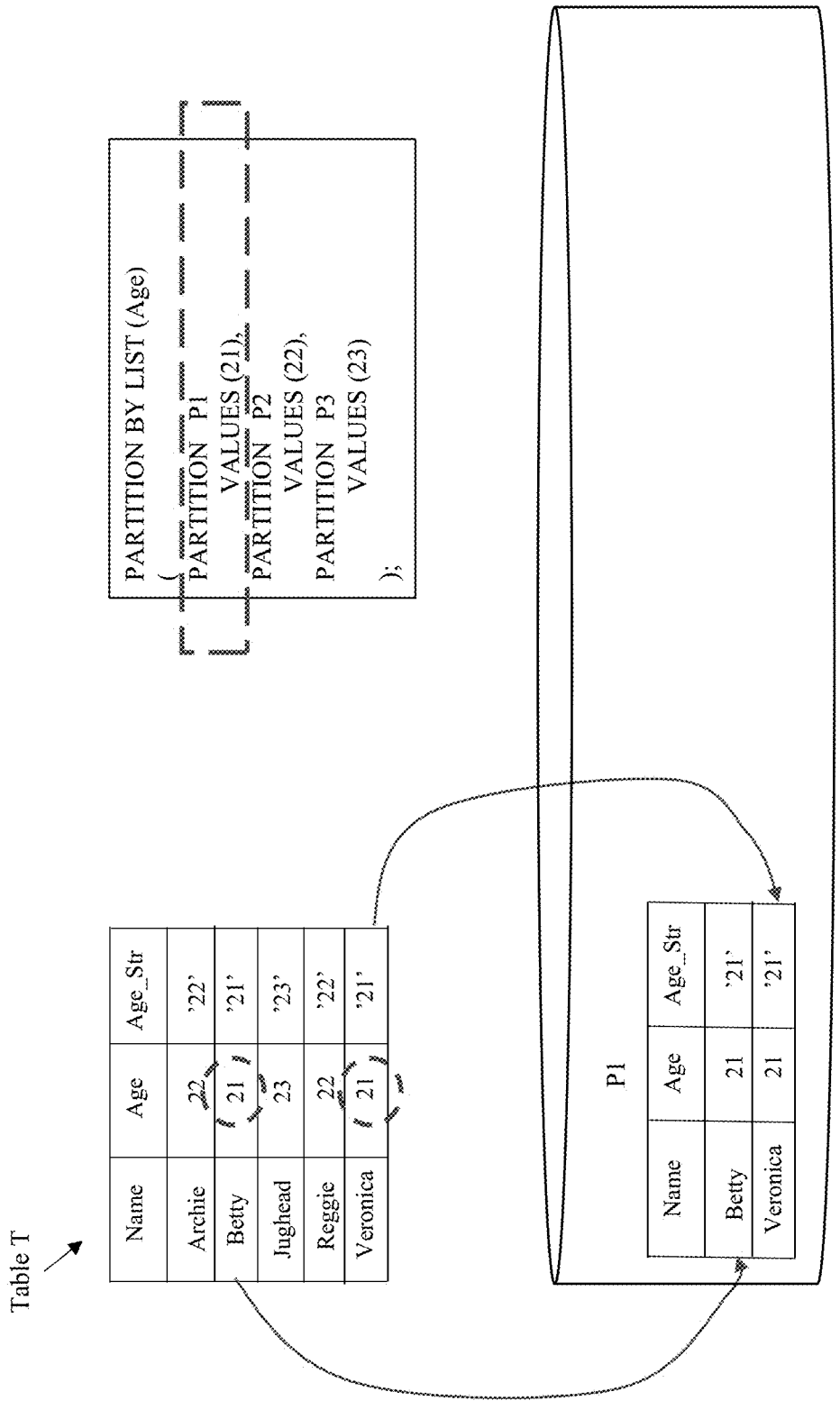

FIG. 3D illustrates the placement of rows from table T into partition P1. Here, the partition bounds identify partition P1 to hold all rows that have the value 21 in the "Age" column. Examination of the rows in the table show that only two rows match this condition. The rows having the values "Betty" and "Veronica" in the "Name" column both include the value 21 in the "Age" column. Therefore, these two rows are placed into partition P1.

Figure 3E:
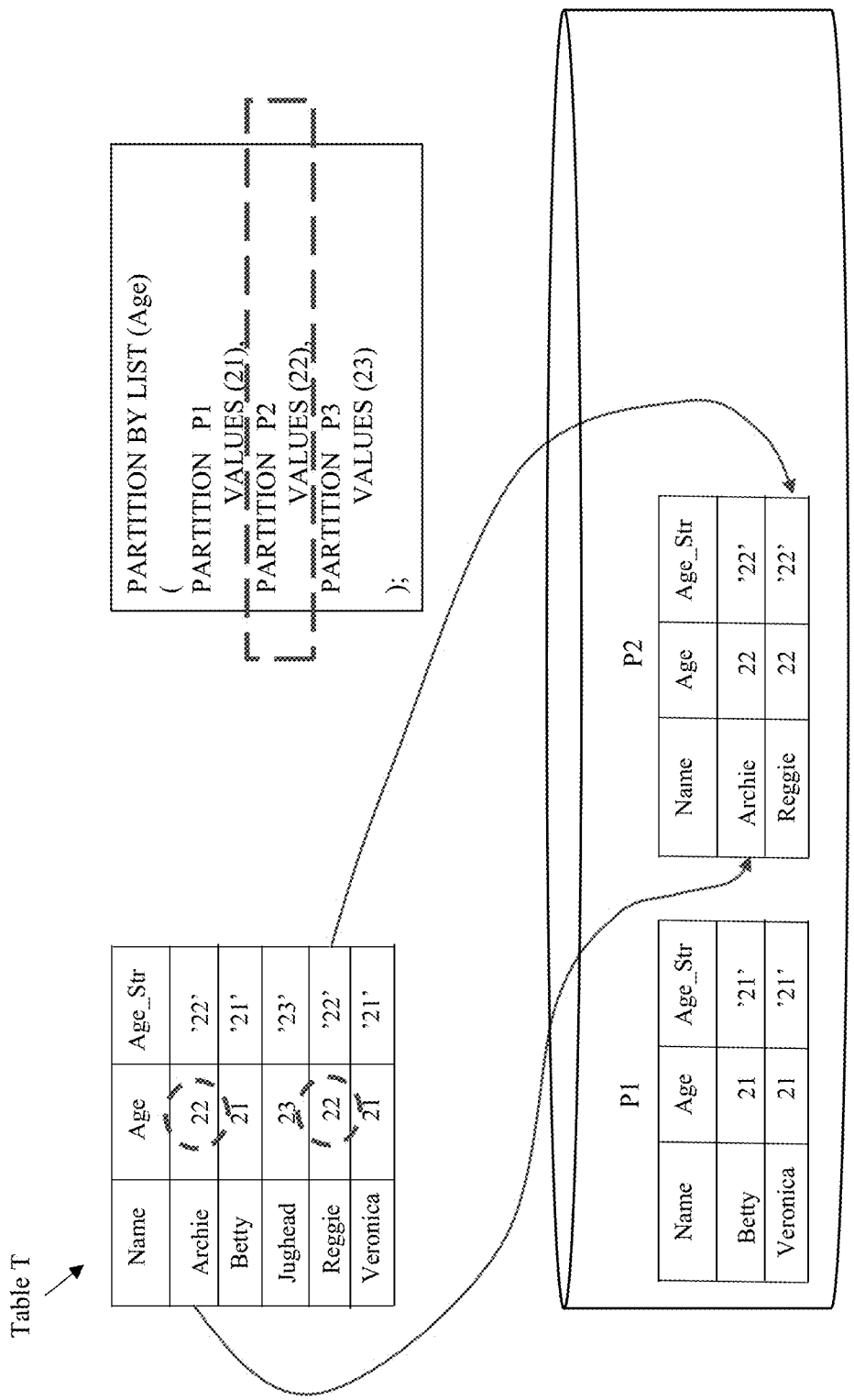

FIG. 3E illustrates the placement of rows from table T into partition P2. The partition bounds identify partition P2 to hold all rows that have the value 22 in the "Age" column. Examination of the rows in the table show that two rows match this condition. The rows having the values "Archie" and "Reggie" in the "Name" column both include the value 22 in the "Age" column. Therefore, these two rows are placed into partition P2.

FIG. 3F illustrates the placement of rows from table T into partition P3. The partition bounds identify partition P3 to hold all rows that have the value 23 in the "Age" column. Examination of the rows in the table show that only a single row matches this condition. The row having the value "Jughead" in the "Name" column includes the value 23 in the "Age" column. Therefore, this row is placed into partition P3.

Figure 3G:
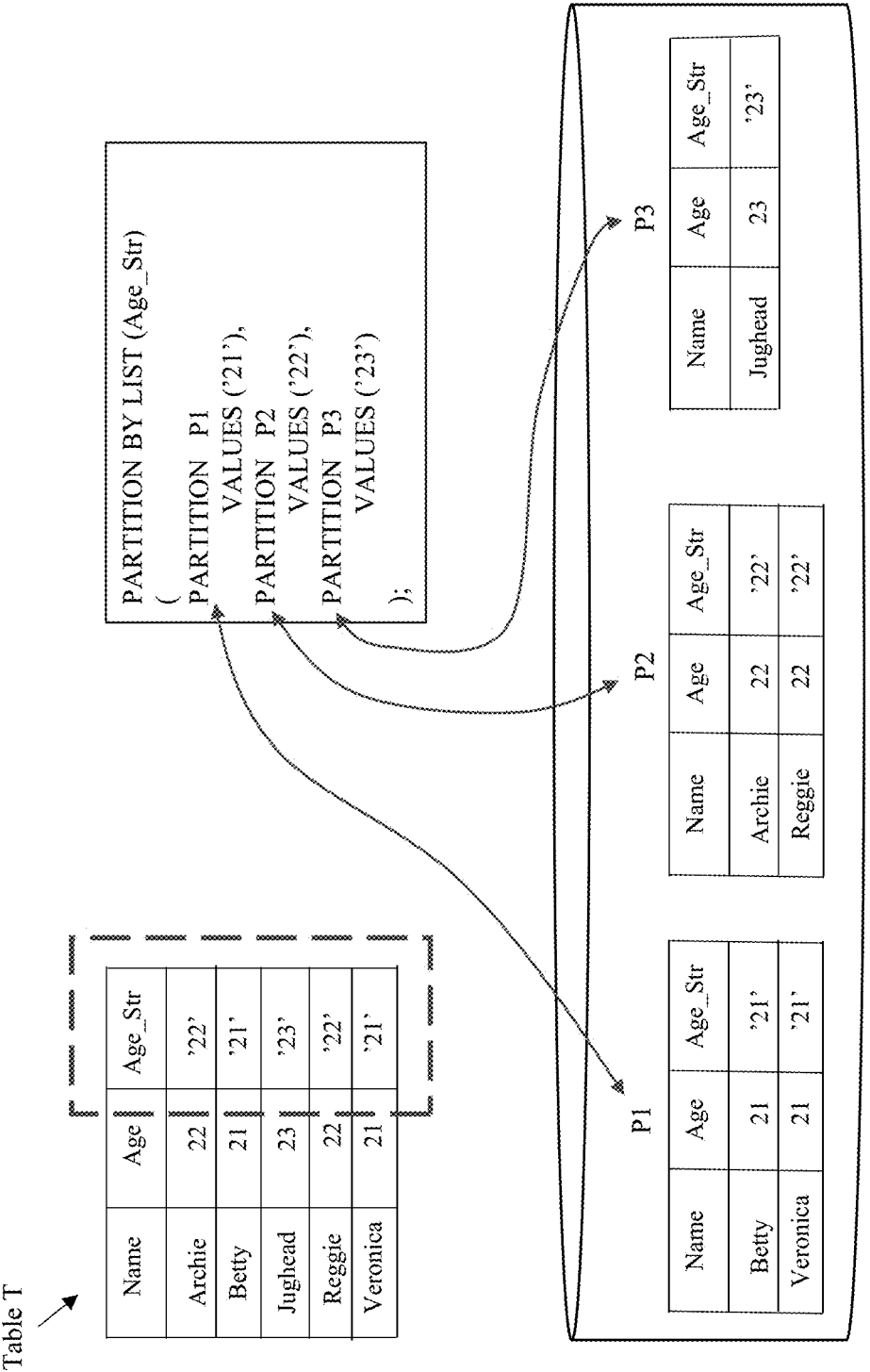

FIG. 3G illustrates the circumstance where an additional partitioning scheme is applied to the same table. Here, the additional partition scheme is also using list partitioning, but the main difference from the base partitioning scheme is that the partitioning key is the virtual "Age_str" column—unlike the previous partitioning scheme which identifies the "Age" column as the partitioning key. For this new partition scheme, the partition bounds identify partition P1 to hold all rows that have the string value '21' in the "Age_str" column, partition P2 to hold all rows that have the string value '22' in the "Age_str" column, and partition P3 to hold all rows that have the value '23' in the "Age_Str" column.

Figure 3H:
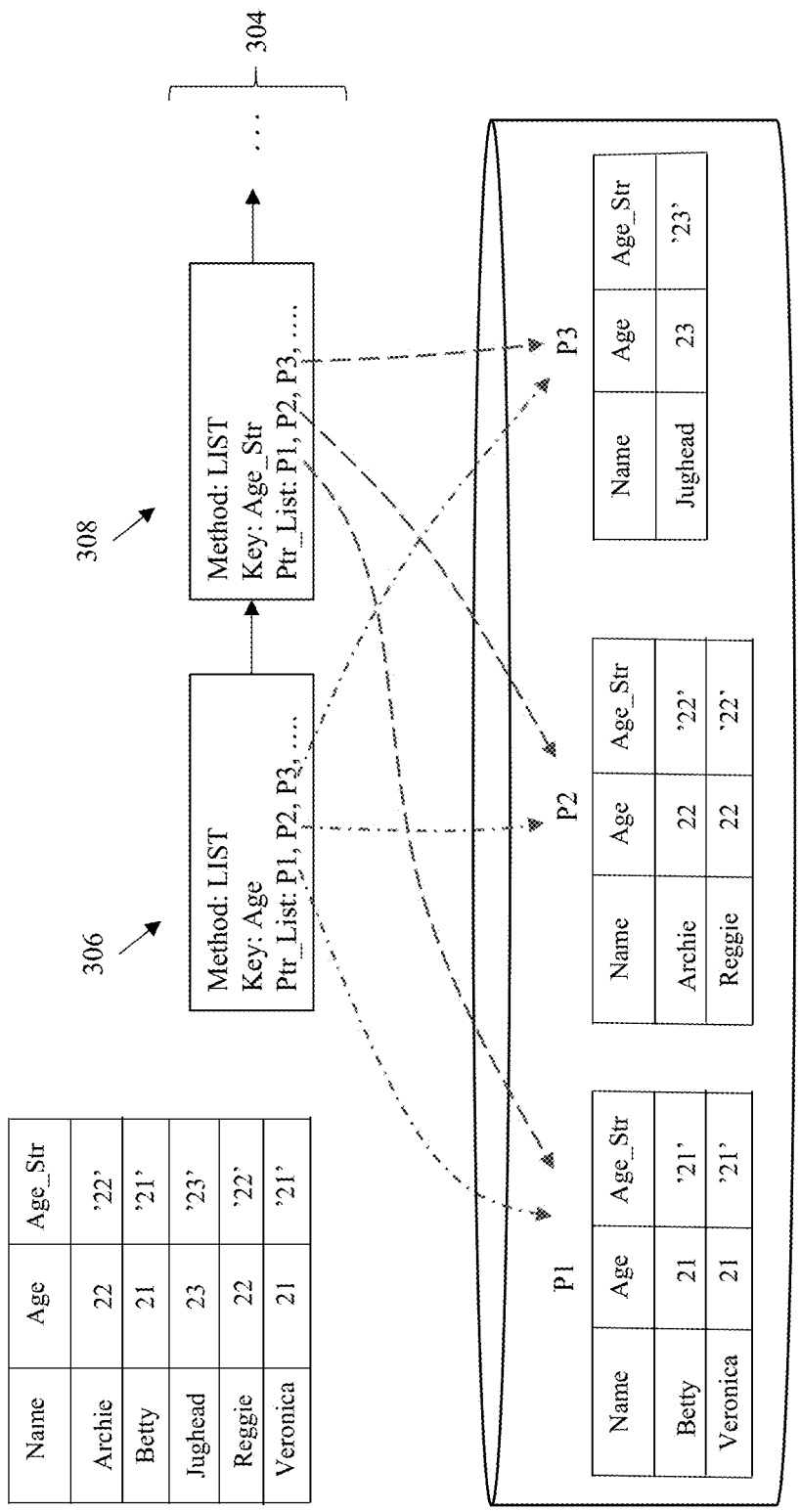

FIG. 3H illustrates the construction of a metadata structure 304 to track the multiple partition schemes that are applicable to table T. Metadata structure 304 is a linked list having a list of items that pertain to each partition scheme that corresponds to table T. A first metadata object 306 corresponds to the base partitioning scheme for table T, which identifies the partitioning method as "List" and the partitioning key as the "Age" column. Metadata object 306 includes a pointer list that points to the different partitions that hold the data for table T. The second metadata object 308 corresponds to the additional partitioning scheme for table T, which identifies the partitioning method as "List" and the partitioning key as the virtual "Age_str" column. Metadata object 308 also includes a pointer list that points to the different partitions that hold the data for table T.

This illustrative example describes a situation where the database object includes a virtual column. It is noted that a similar approach described above for a virtual column may also be applied for pseudocolumns. Like a virtual column, a pseudocolumn behaves like a table column, but is not actually stored in the table. Also like a virtual column, a database statement can select from pseudocolumns but cannot insert, update, or delete their values. However, whereas a virtual column is often defined based upon one or more other column values in the same row, a pseudo column is often not defined as such (e.g., a row ID column is an example of a pseudocolumn having values that are not defined based upon other column values in the same row).

A pseudocolumn is similar to a function without arguments. However, functions without arguments typically return the same value for every row in the result set, whereas pseudocolumns typically return a different value for each row. With both virtual columns and pseudocolumns, a partitioning scheme may be defined where the partition key corresponds to the virtual column or pseudocolumn.

Figure 4:
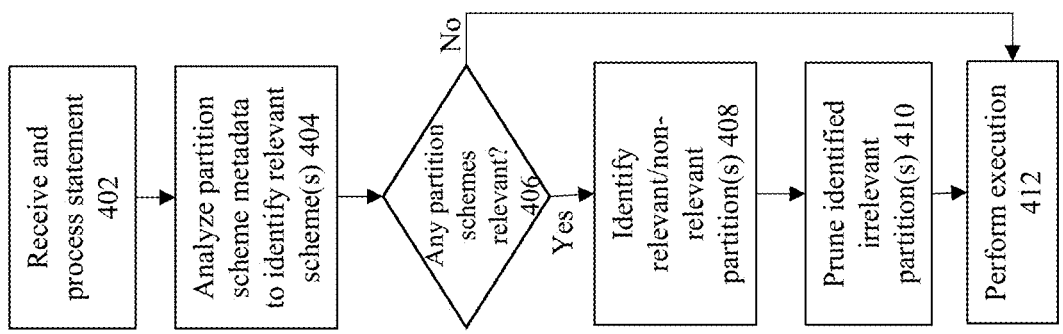
FIG. 4 shows a flowchart of an approach to use the multiple partition schemes to process database commands.

FIG. 4 shows a flowchart of an approach to use the multiple partition schemes to process database commands. At 402, a database statement is received for execution. Any suitable type of statement may be received, including for example, DML (data manipulation language) statement, DDL (data description language statements), and/or generally any SQL statements such as queries. For purposes of the current embodiment of the invention, the received statement is directed to a database object that is subject to multiple types of partition schemes.

At 404, the partition scheme metadata is analyzed to identify whether any of the partition schemes are pertinent to the database statement. This action can be accomplished, for example, by walking the linked list structure of the metadata, and reviewing the attributes of each scheme to identify whether there is a match to the relevant portion(s) of the database statement. The database statement may refer to multiple database objects, and thus there may be multiple metadata linked list structures that are reviewed to identify partition scheme matches.

A determination is made at 406 whether there are any partition schemes that are relevant to the database statement. One approach that can be taken to perform this determination is to check whether the predicate of a SQL statement has a condition premised on a column that matches the partition key of a specific partition scheme. It is noted that a given statement may match against zero partition schemes, one partition scheme, or multiple partition schemes.

If there are one or more matches to partition schemes for the database object, then at 408, identification is made of the potentially relevant and/or non-relevant partitions associated with the database object referenced in the database statement. This action can be implemented, for example, by looking at the predicate of the database statement, and reviewing whether any of the partitions are defined with partition bounds that do not intersect with the predicate condition. If so, then those identified partitions are irrelevant, since they do not contain any content that would otherwise be returned from processing the database statement.

At 410, one or more optimizations may be performed based upon at least the identification of relevant and/or irrelevant partitions. For example, the scheme described by each metadata object may identify partitions useful to perform partition-wise join, group by pushdown, order by pushdown, and/or slave mapping during query optimization and/or code generation. For purposes of this illustrative example, partition pruning may be applied to prune any irrelevant partitions from downstream processing of the database statement.

At 412, the database statement is then executed. If any partitions had been pruned in the previous step, then the execution of the statement will occur only upon the remaining partitions that had not previously been pruned. Partition pruning therefore reduces the volume of data that must be processed to execute the database statement, thereby decreasing the memory requirements for loading data from the database to process the statement, as well as faster operation of a processor to handle the statement since less data needs to be addressed by the processor. This combines to reduce computing system response times while also reducing the expense/overhead of the hardware costs that are needed to handle workload in the system.

It is noted that there are multiple partition schemes that have been defined for the database object(s) referenced in the database statement. Therefore, it is possible that depending upon the specifics of any given query, a first statement may be optimized using a first partition scheme, a second statement may be optimized using a second partition scheme that is different from the first partition scheme, and a third statement may be optimized using both the first and second partition schemes. Each different optimization may result in different actions taken to process the respective statement. For example, the first optimization may serve to prune a first set of partitions based upon a first column, the second optimization may prune a second set of partitions based upon a second column, and the third optimization may prune a third set of partitions based upon multiple columns.

Figure 5A:
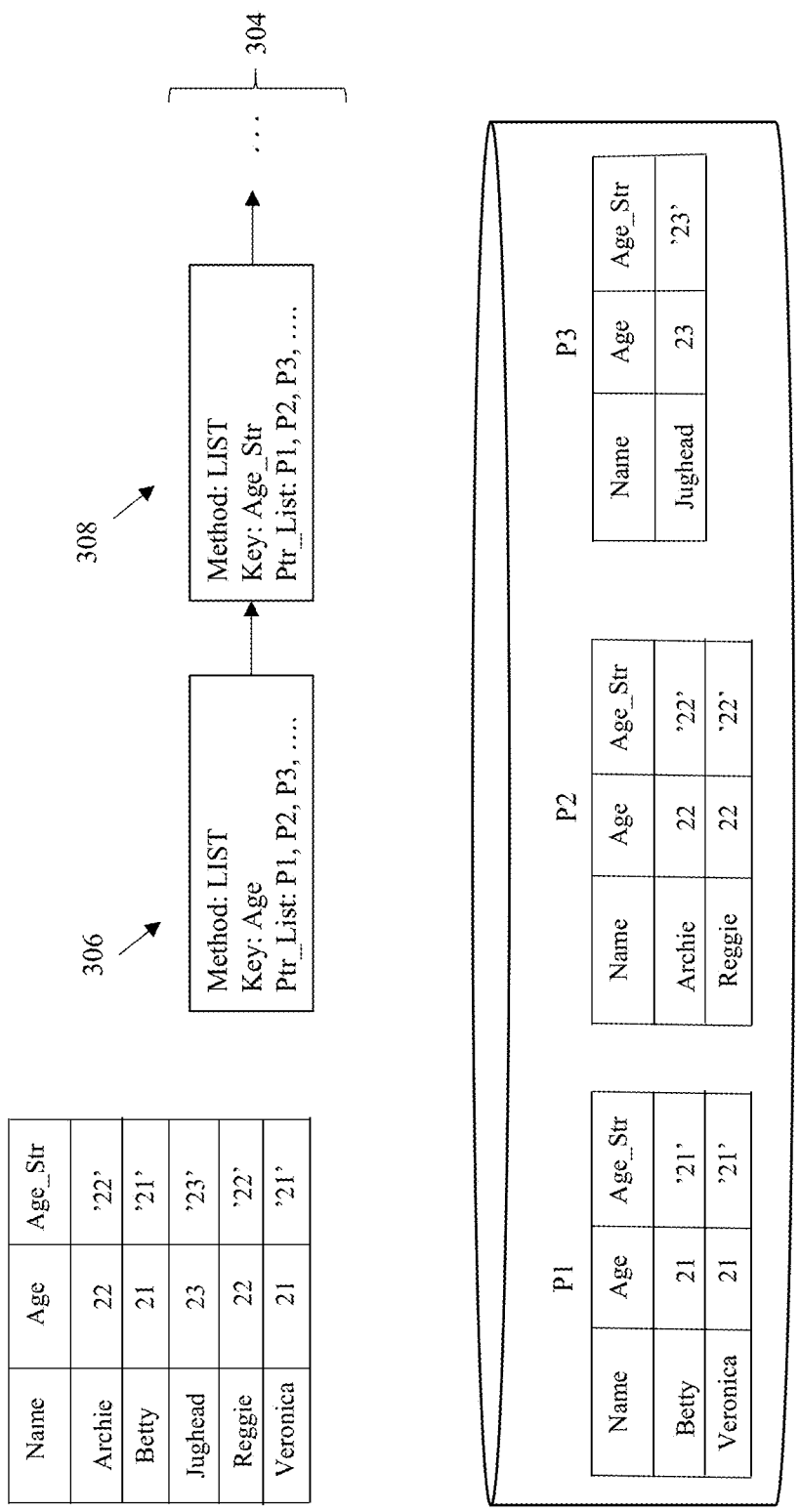
FIGS. 5A-5F, 6A-6E, and 7A-7F provide an illustration of a database query being applied to a database object that is subject to multiple partitions schemes.

FIGS. 5A-5F provide an illustration of a database query being applied to a database object that is subject to multiple partitions schemes, using the example of FIGS. 3A-3H. FIG. 5A shows the table T, where the contents of this table are stored within partitions P1, P2, and P3. The table T corresponds to multiple partition schemes, where the metadata structure 304 is used to track the multiple partition schemes that are applicable to table T. As previously noted, metadata structure 304 is a linked list having a separate list items for each separate partition scheme that corresponds to table T. Metadata object 306 corresponds to the base partitioning scheme for table T, which identifies the partitioning method as "List" and the partitioning key as the "Age" column. A pointer list is also included in object 306 that points to the different partitions that hold the data for table T. The second metadata object 308 corresponds to the additional partitioning scheme for table T, which identifies the partitioning method as "List" and the partitioning key as the virtual "Age_str" column. Metadata object 308 also includes a pointer list that points to the different partitions that hold the data for table T.

Figure 5B:
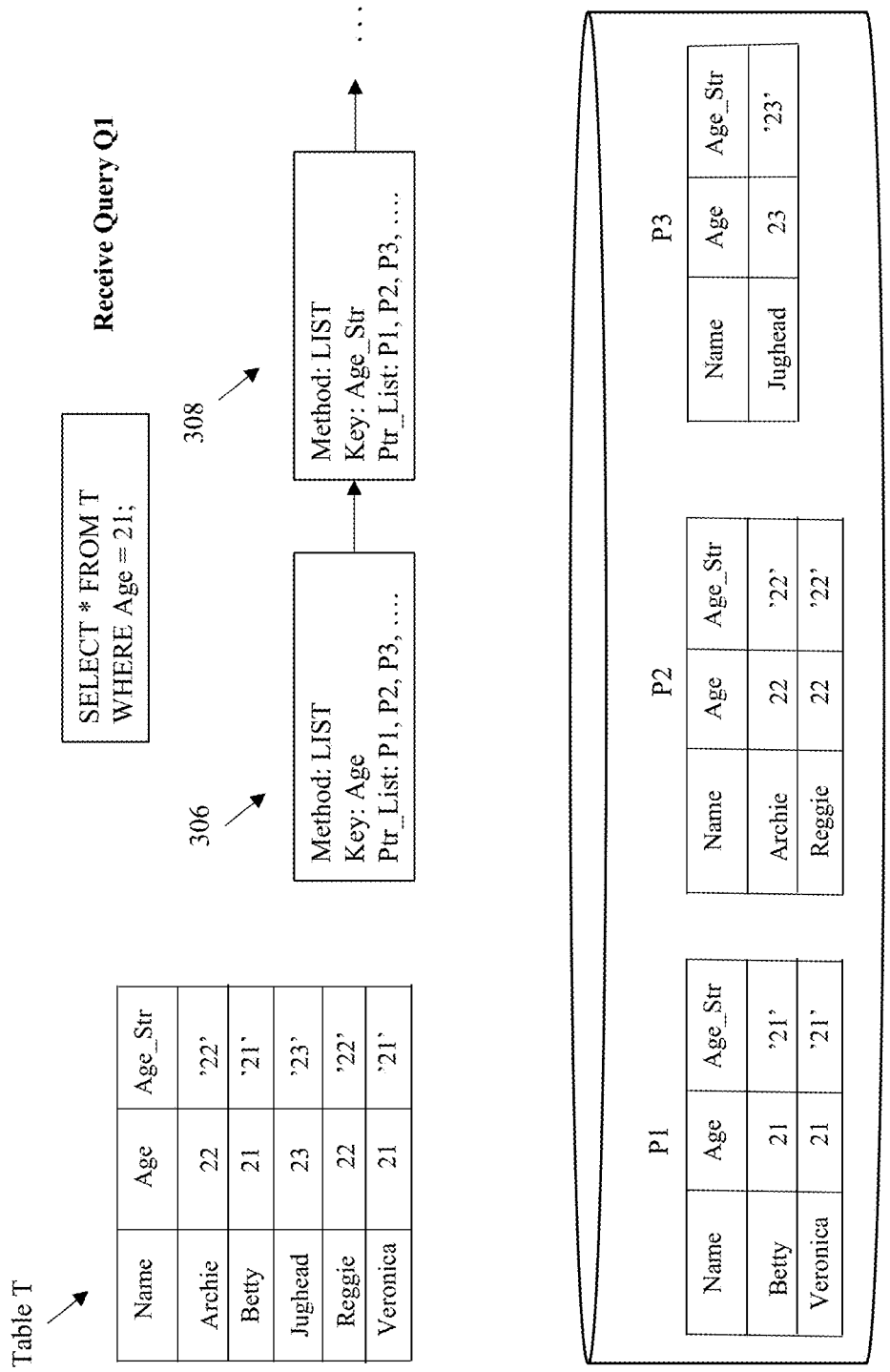

As shown in FIG. 5B, a query Q1 may be received that seeks content from within table T. Here, query Q1 includes the following statement text: "SELECT * FROM T WHERE Age=21". The predicate of this query is "WHERE Age=21", which includes a predicate condition on the "Age" column. In particular, this query seeks all rows from the table T where the numeric value 21 appears in the "Age" column.

Figure 5C:
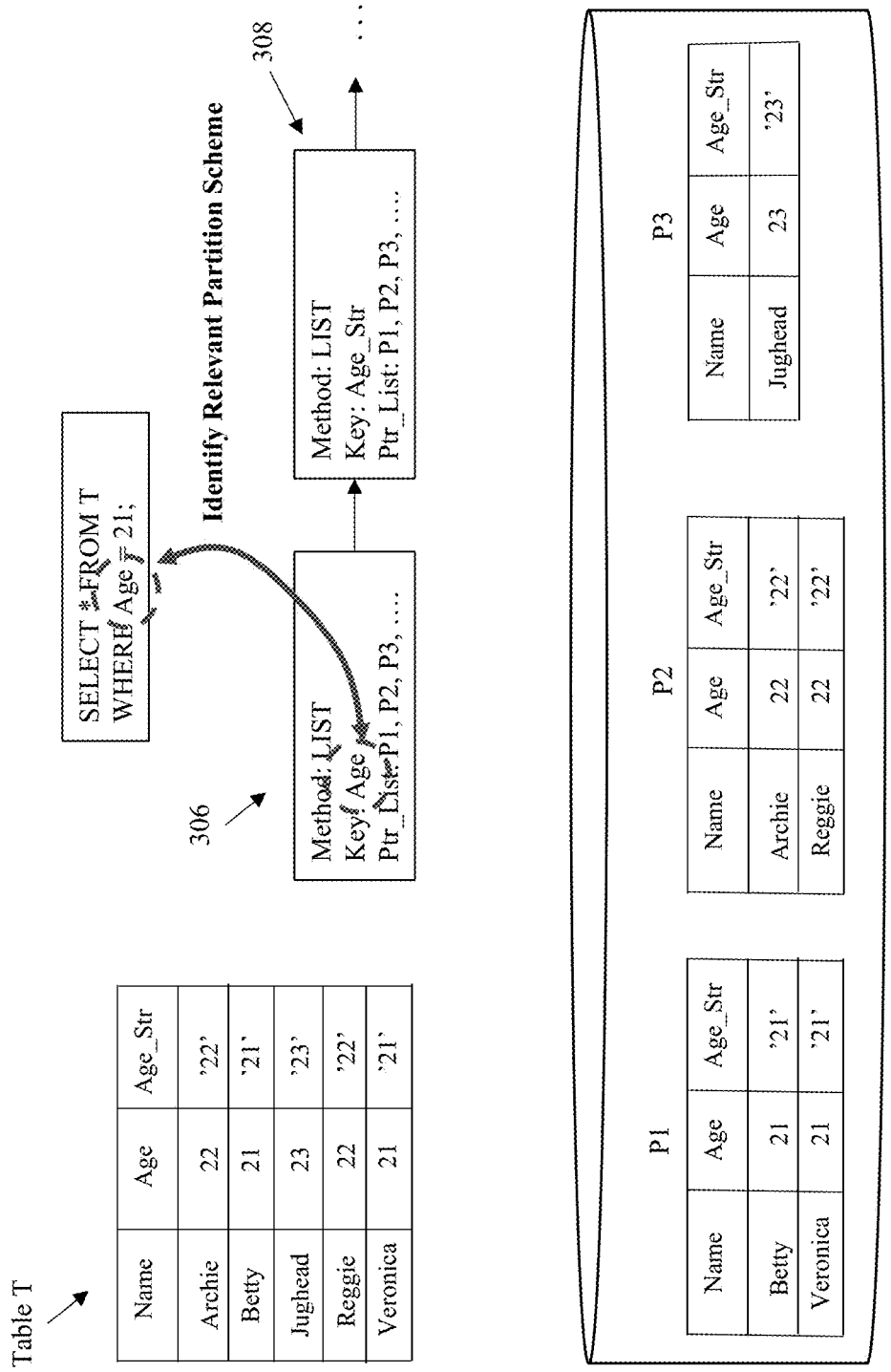

As illustrated in FIG. 5C, the system will attempt to identify a relevant partition scheme from among the multiple schemes applicable to the table T. This is accomplished by walking the metadata structure to identify one or more relevant metadata objects. Here, the predicate condition for query Q1 is premised upon the "Age" column, which matches the partition key for the partition scheme for metadata object 306. Therefore, the partition scheme associated with metadata object 306 is identified as a relevant partition scheme.

Figure 5D:
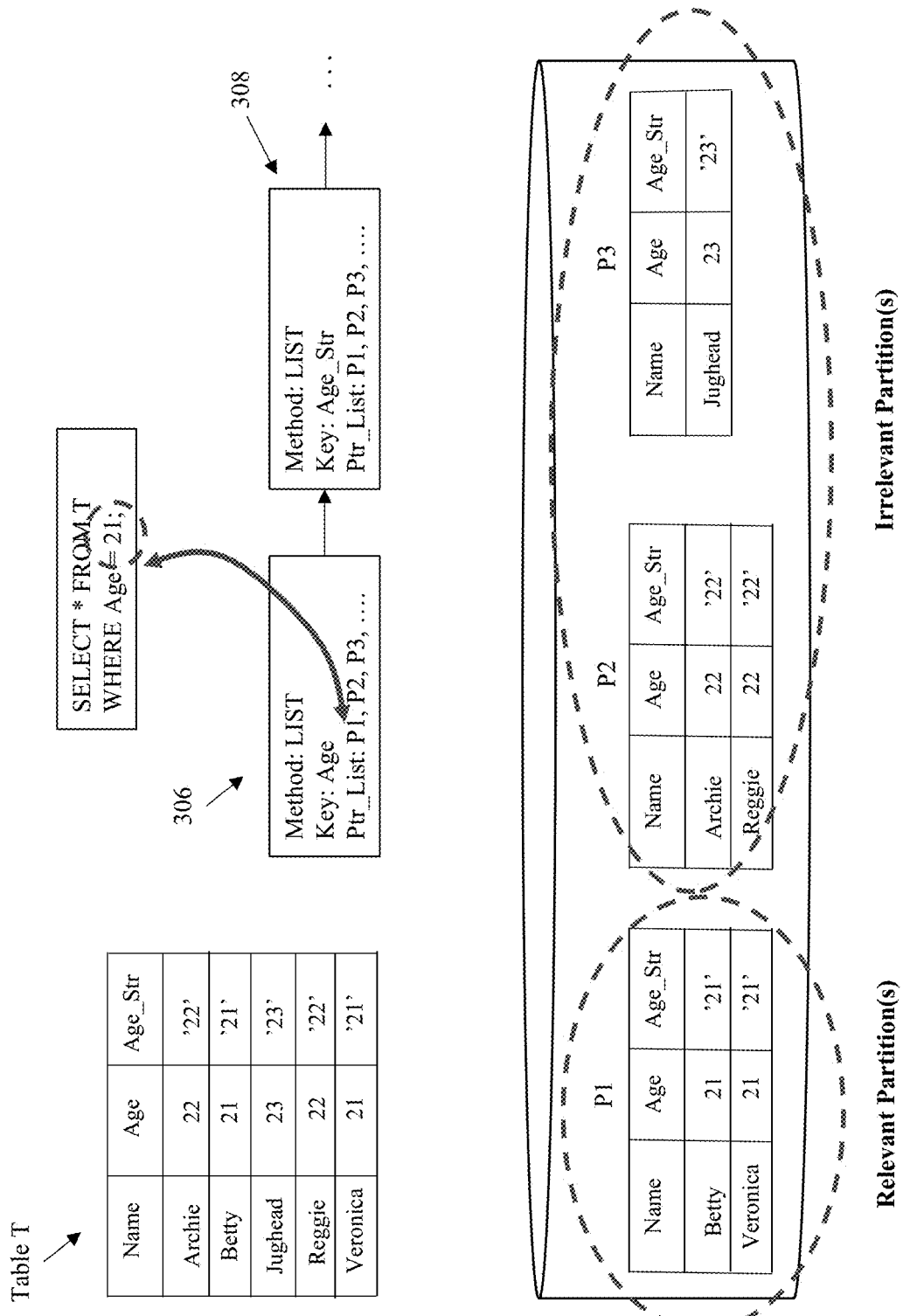

As illustrated in FIG. 5D, identification of one or more relevant and/or irrelevant may now occur. This may be checked, for example, by reviewing the predicate of the database statement, and determining whether any of the partitions are defined with partition bounds that do not intersect with the predicate condition. Here, the predicate condition specifies a numeric value 21 that must exist in the "Age" column. Therefore, any partition(s) having a partition bound that intersects with this number (partition P1) is considered a relevant partition. Any partitions having a partition bound that does not intersect with this number (partitions P2 and P3) are considered irrelevant partitions. It is noted that certain types of optimizations may require only identification of relevant partitions, other optimizations may require identification of only irrelevant partitions, and yet other optimizations may use identifications of both types of partitions.

Figure 5E:
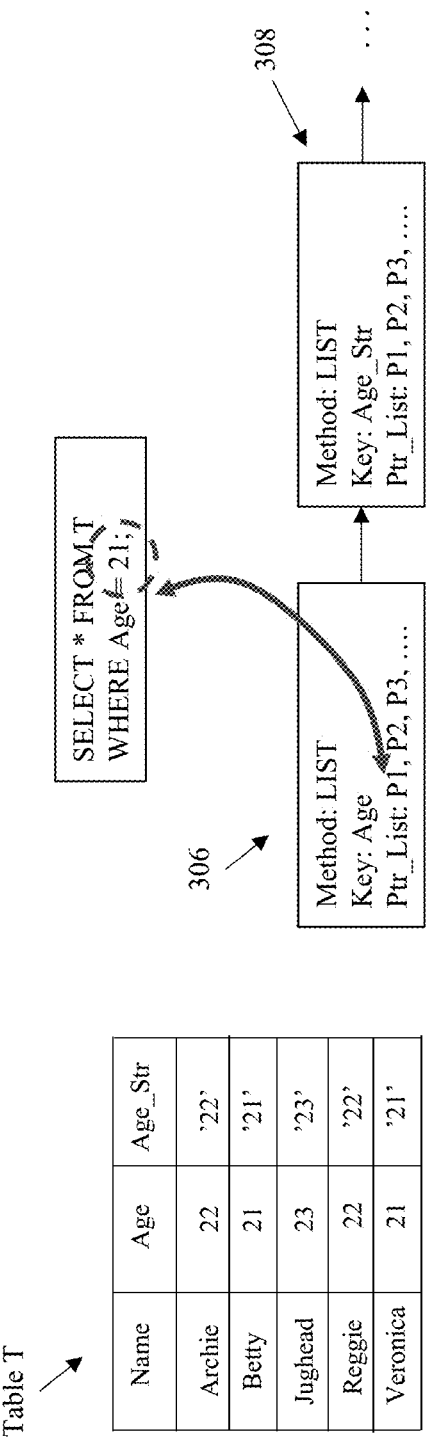
Figure 5E:
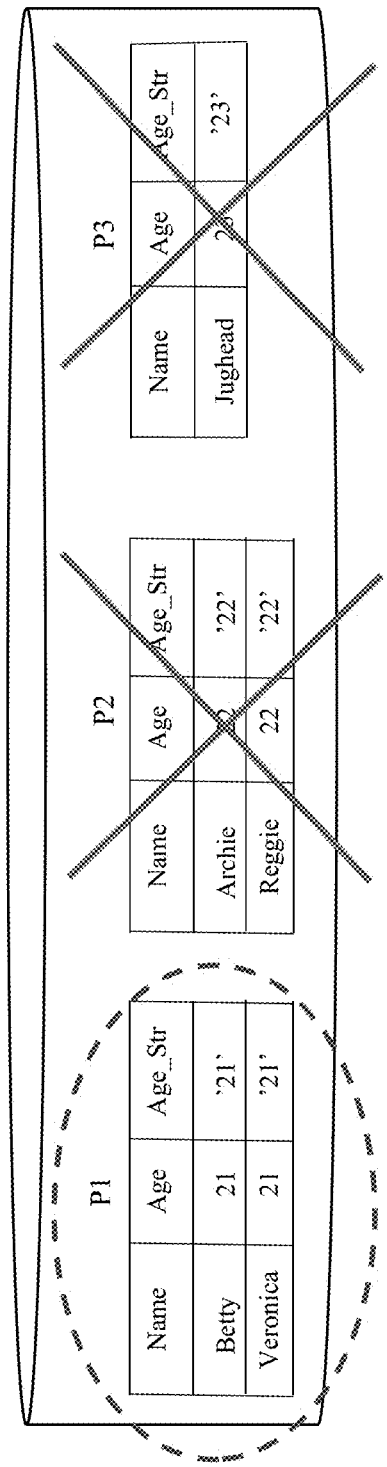

As shown in FIG. 5E, partition pruning may be applied to optimize query processing for query Q1. As noted above, partitions P2 and P3 have been identified as irrelevant, since they do not contain any content that would otherwise be returned from processing the database statement. Therefore, these two partitions can be pruned from execution of the query.

Figure 5F:
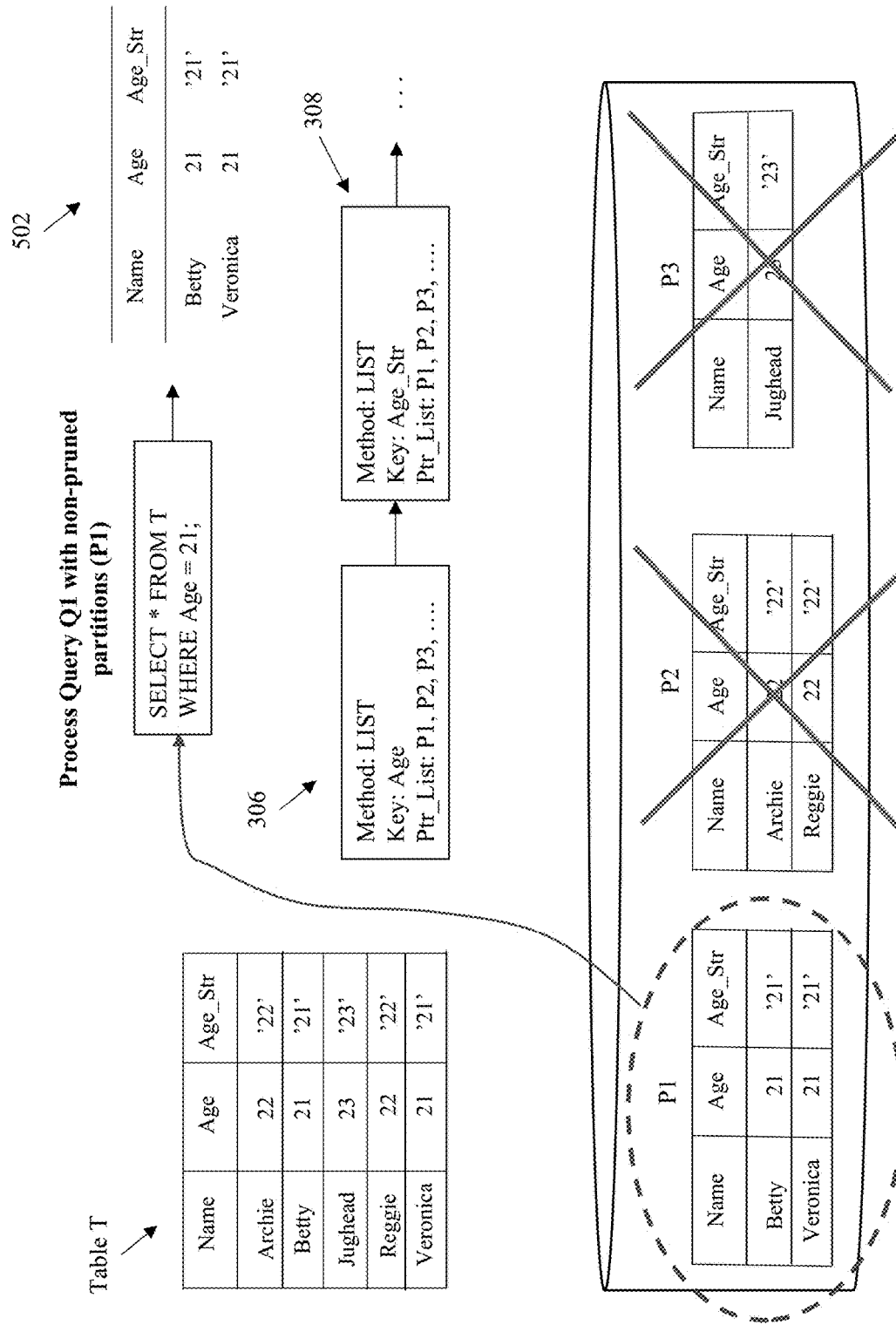

As illustrated in FIG. 5F, the query Q1 can now be processed using the remaining non-pruned partitions. Here, only partition P1 remains after partitions P2 and P3 have been pruned. Therefore, only partition P1 needs to be loaded and processed to execute the query. As such, the query results 502 are generated from processing only the contents of partition P1.

Figure 6A:
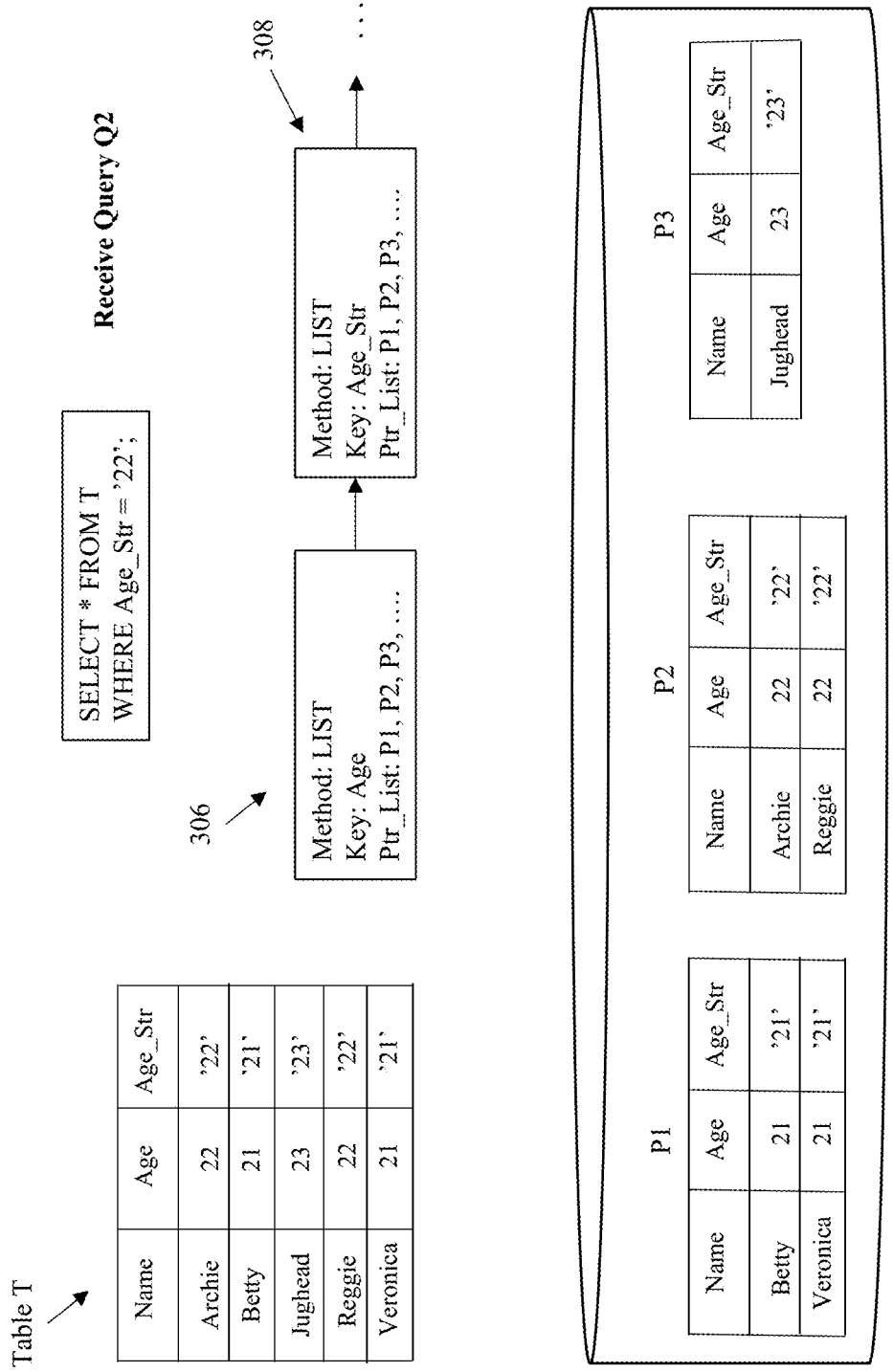

FIGS. 6A-E provide another example situation of a different database query being applied to database table T. As shown in FIG. 6A, the new query Q2 seeks content from within table T, where Q2 includes the following statement text: "SELECT * FROM T WHERE Age_str='22';". The predicate of this query is "WHERE Age_str='22'", which includes a predicate condition on the "Age_str" column. In particular, this query seeks all rows from the table T where the string value '22' appears in the "Age_str" column.

It is notable that this query Q2 has a predicate condition premised on a completely different column (the "Age_Str" column) from the predicate condition of the previous query Q1 (which has a predicate condition premised on the "Age" column). This means that the current query Q2 would not be able to able to perform optimization using the same partition scheme that was used to optimize query Q1 (the scheme associated with metadata object 306). Therefore, with the existing, conventional approach of limiting a database object to just a single partition scheme, query Q2 would not have been able to undergo partition-based optimizations.

Figure 6B:
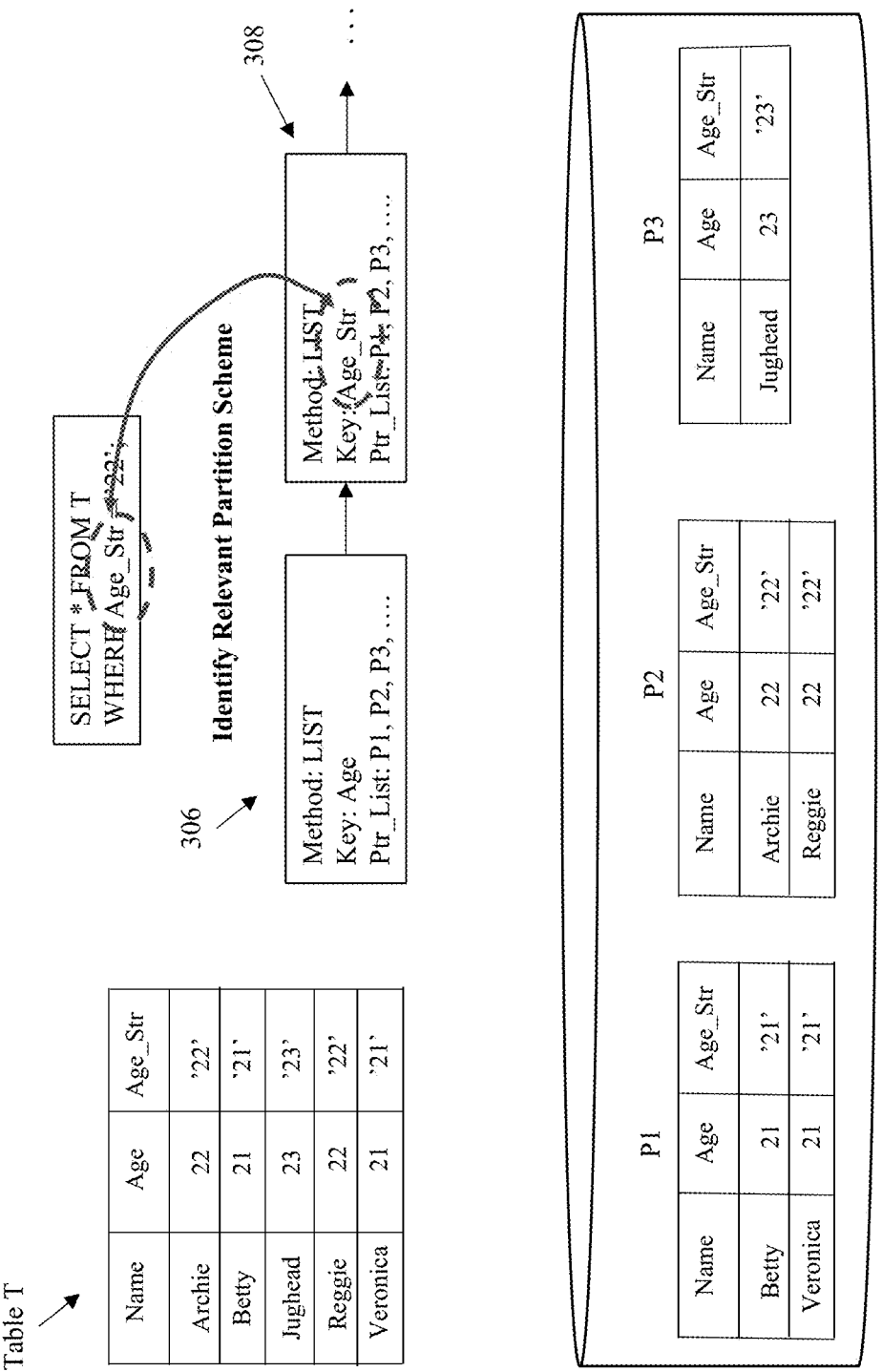

With current embodiments of the invention, there are multiple partition schemes that are applicable to the database object (table T). Therefore, as shown in FIG. 6B, the metadata structure can be reviewed to identify a relevant partition scheme from among the multiple schemes applicable to the table T. Even if one of the partition schemes is not applicable to the current query, it is possible that at least one of the other partition schemes is relevant. Here, as noted above, metadata object 306 corresponds to a partition scheme that is not pertinent to the current query, since the partition key for object 306 (the "Age" column) does not match the query condition for query Q2 (the "Age_str" column). However, metadata object 308 does appear to match the current query Q2, since the partition key for object 308 (the "Age_str" column) exactly matches the query condition for query Q2 (the "Age_str" column).

Figure 6C:
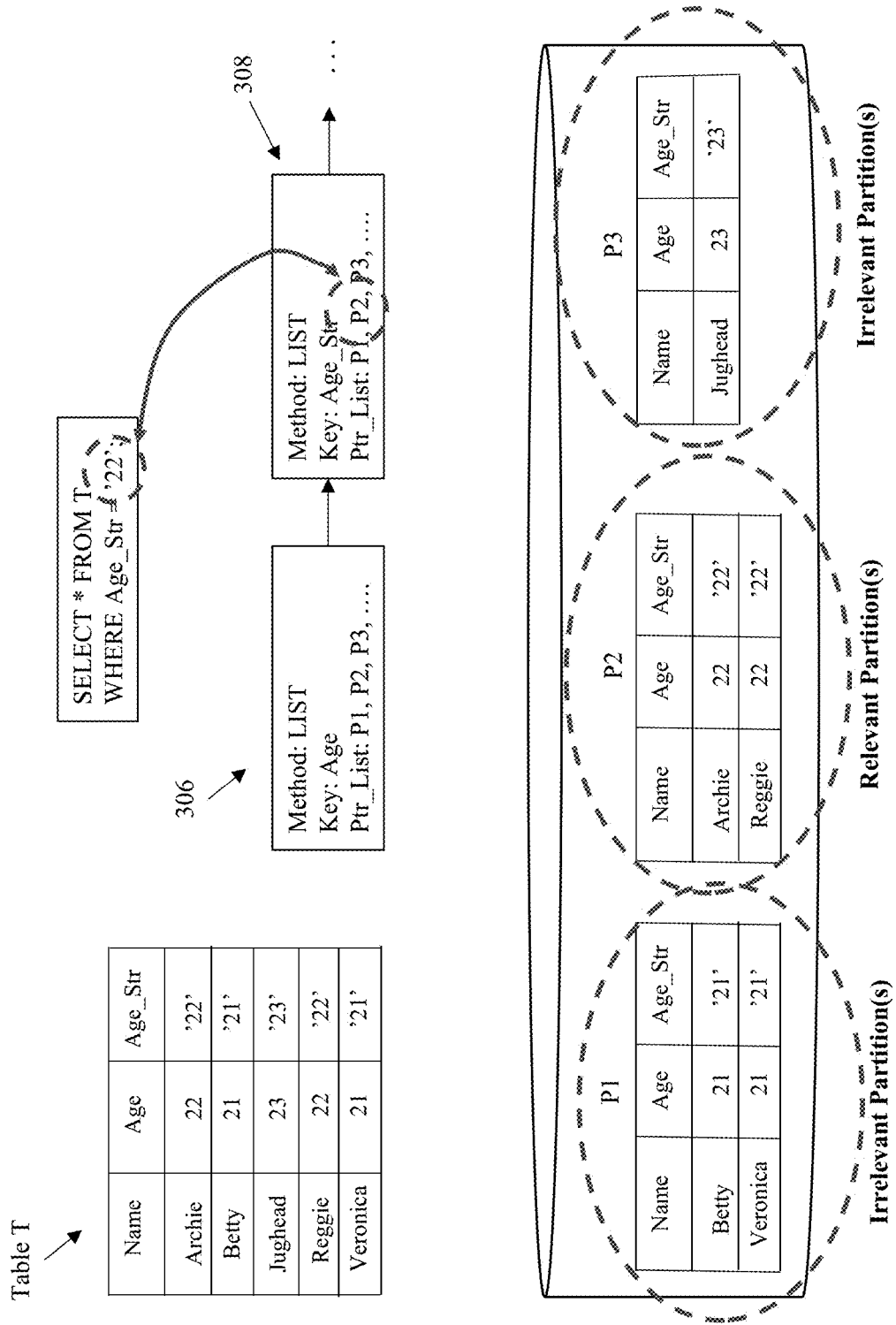

As illustrated in FIG. 6C, identification of one or more relevant and/or irrelevant may now occur. The predicate condition specifies a string value in the "Age_str" column to include the value '22'. Therefore, any partition(s) having a partition bound that intersects with this value (partition P2) is considered a relevant partition. Any partitions having a partition bound that does not intersect with this value (partitions P1 and P3) are irrelevant partitions.

Figure 6D:
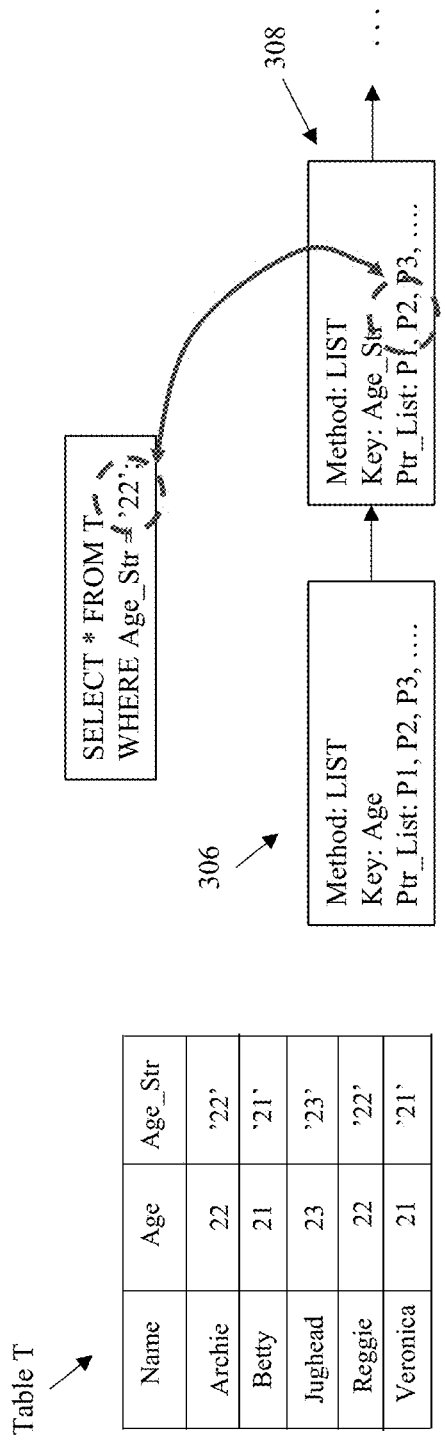
Figure 6D:
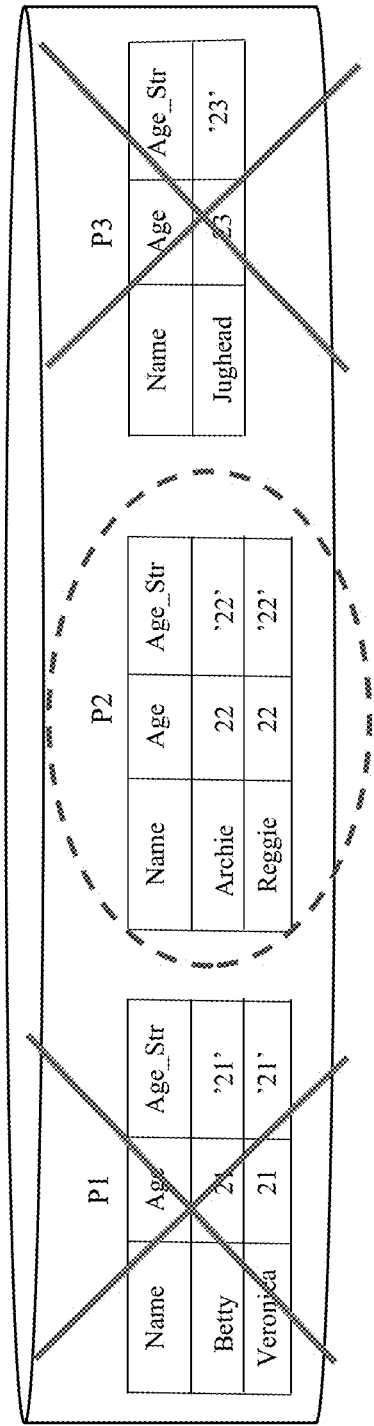

As shown in FIG. 6D, partition pruning may be applied to optimize query processing for query Q2. As noted above, partitions P1 and P3 have been identified as irrelevant, since they do not contain any content that would otherwise be returned from processing the database statement. Therefore, these two partitions can be pruned from execution of the query.

Figure 6E:
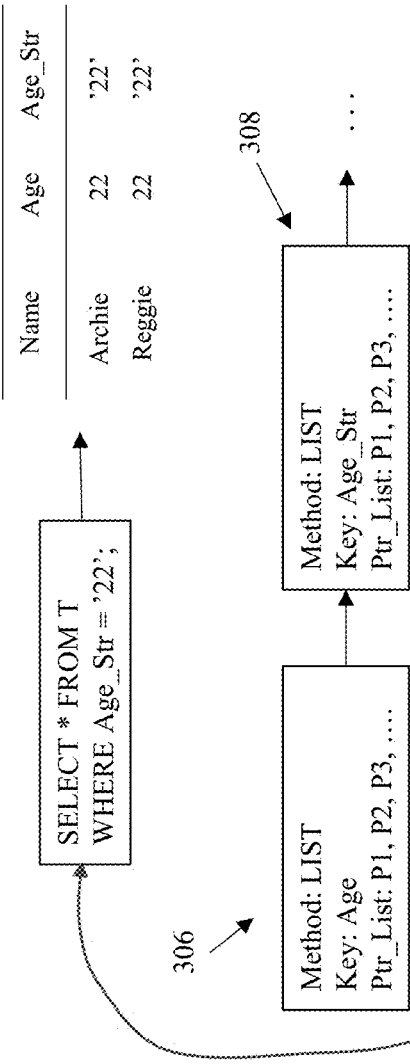
Figure 6E:
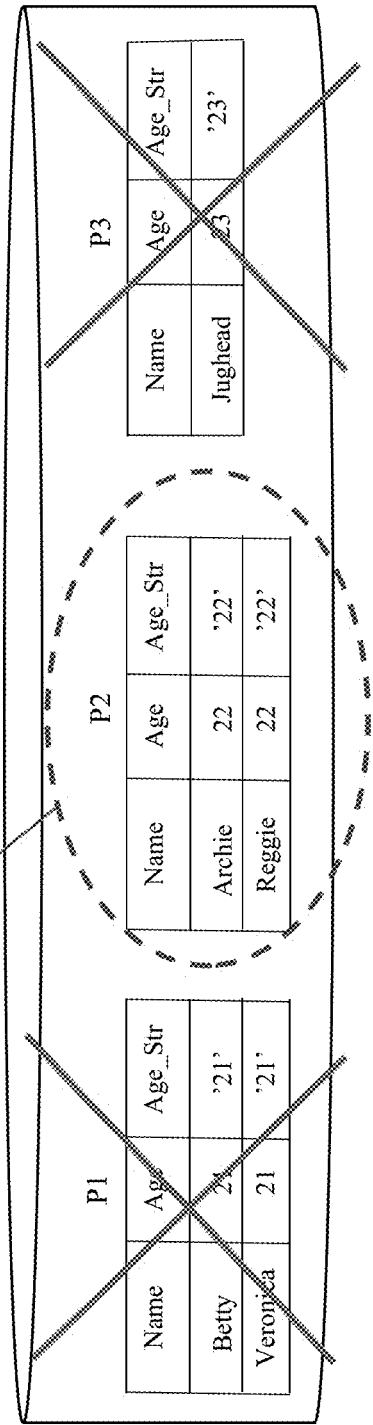

As illustrated in FIG. 6E, the query Q2 can now be processed using the remaining non-pruned partitions. Here, only partition P2 remains after partitions P1 and P3 have been pruned. Therefore, only partition P2 needs to be loaded and processed to execute the query. As such, the query results are generated from processing only the contents of partition P2.

Figure 7A:
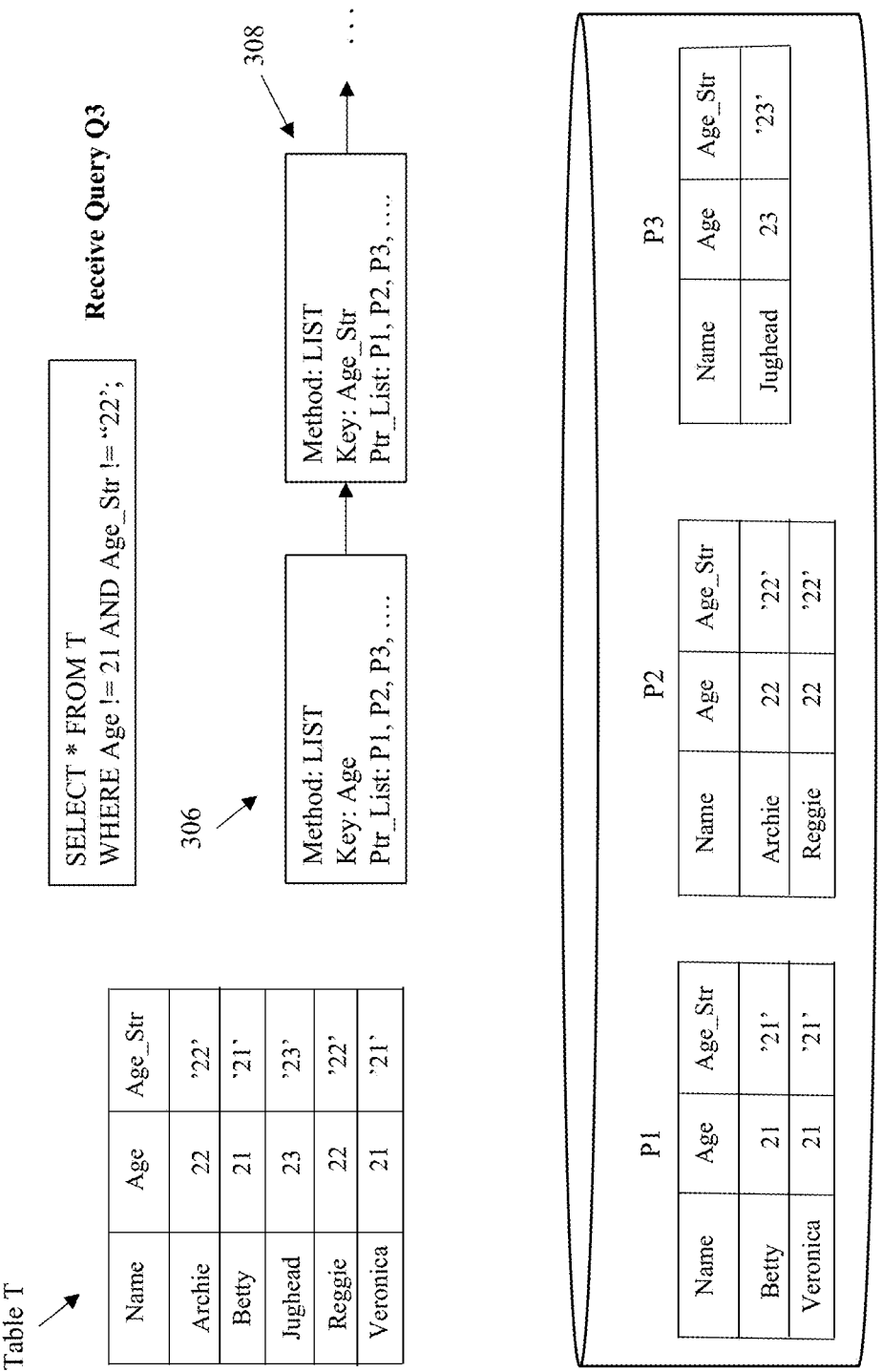

FIGS. 7A-7F provide yet another example situation of a database query being applied to database table T. As shown in FIG. 7A, query Q3 seeks content from within table T, where Q3 includes the following statement text: "SELECT * FROM T WHERE Age !=21 AND Age_str !='22';". The predicate of this query is "WHERE Age !=21 AND Age_str !='22'", which includes a predicate condition on two separate columns—both the "Age" column and the "Age_str" column. In particular, this query seeks all rows from the table T where the string value '22' does not appear in the "Age_str" column and where the numeric value 21 does not appear in the "Age" column.

In contrast to the previous example queries, query Q3 has a predicate condition premised on two distinct columns (the "Age" column and the "Age_Str" column). Both of these columns correspond to partition keys for different partition schemes. Therefore, as illustrated in more detail below, this means that partition-based optimization may be applied using multiple partition schemes for this query.

Figure 7B:
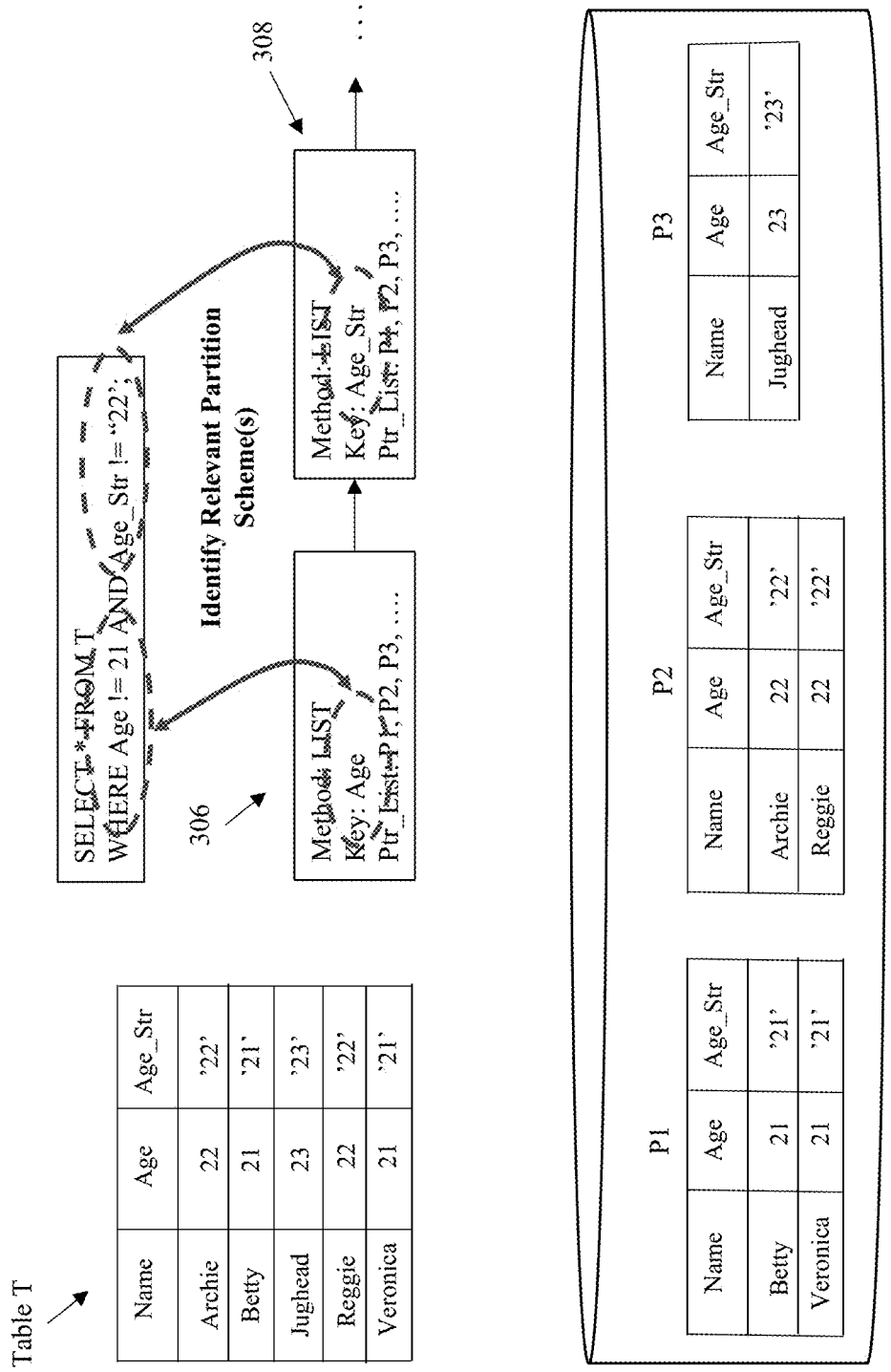

As shown in FIG. 7B, the partition metadata structure can be reviewed to identify a relevant partition scheme from among the multiple schemes applicable to the table T. Here, as noted above, metadata object 306 corresponds to a partition scheme that is pertinent to the current query, since the partition key for object 306 (the "Age" column) matches one of the query conditions in the predicate for query Q3. In addition, metadata object 308 also appears to match the current query Q3, since the partition key for object 308 (the "Age_str" column) also matches one of the query conditions for query Q3.

Identification of one or more relevant and/or irrelevant may now occur. Since there are multiple relevant partition schemes, the metadata for each pertinent scheme can be processed to identify the relevant and/or irrelevant partitions for each scheme.

Figure 7C:
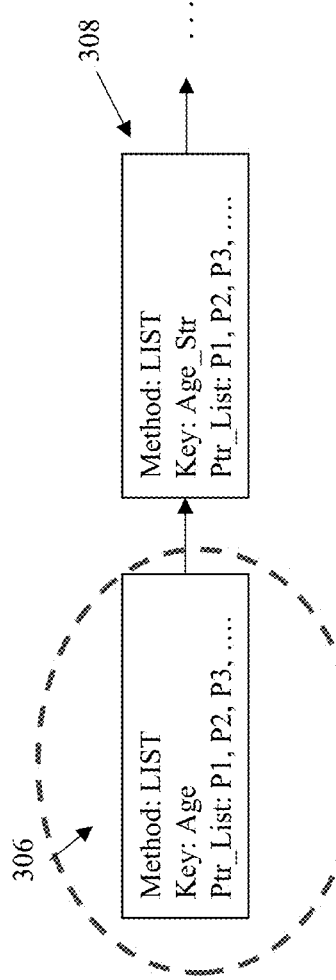
Figure 7C:
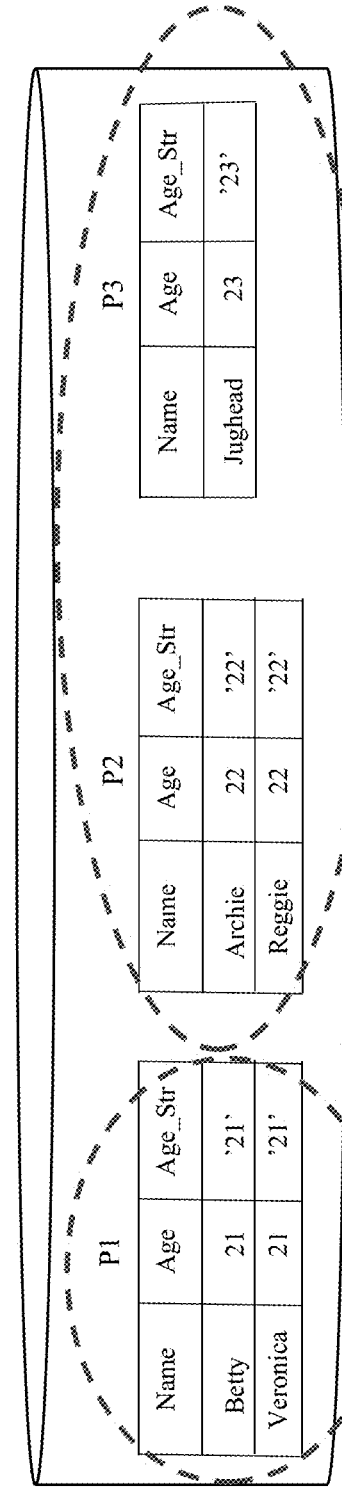

FIG. 7C illustrates the identification of one or more relevant and/or irrelevant partitions for the partition scheme corresponding to metadata object 306. Here, the numeric value in the "Age" column cannot include the number 21 to match the query's predicate condition. Therefore, any partition(s) having a partition bound that intersects with this number (partition P1) is considered an irrelevant partition. Any partitions having a partition bound that does not intersect with this number (partitions P2 and P3) are considered possibly relevant partitions.

Figure 7D:
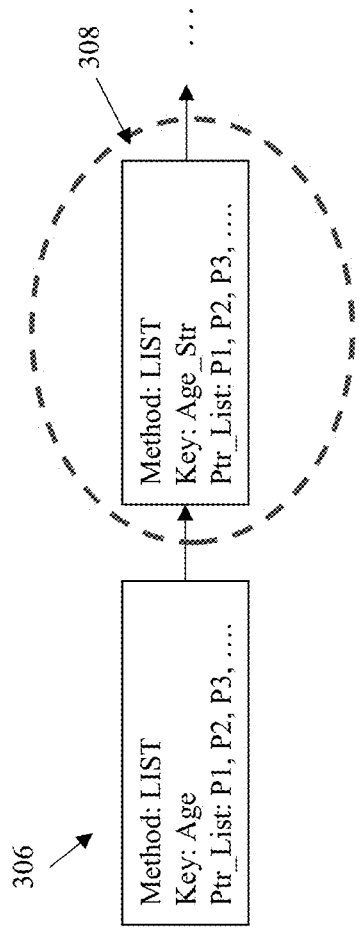
Figure 7D:
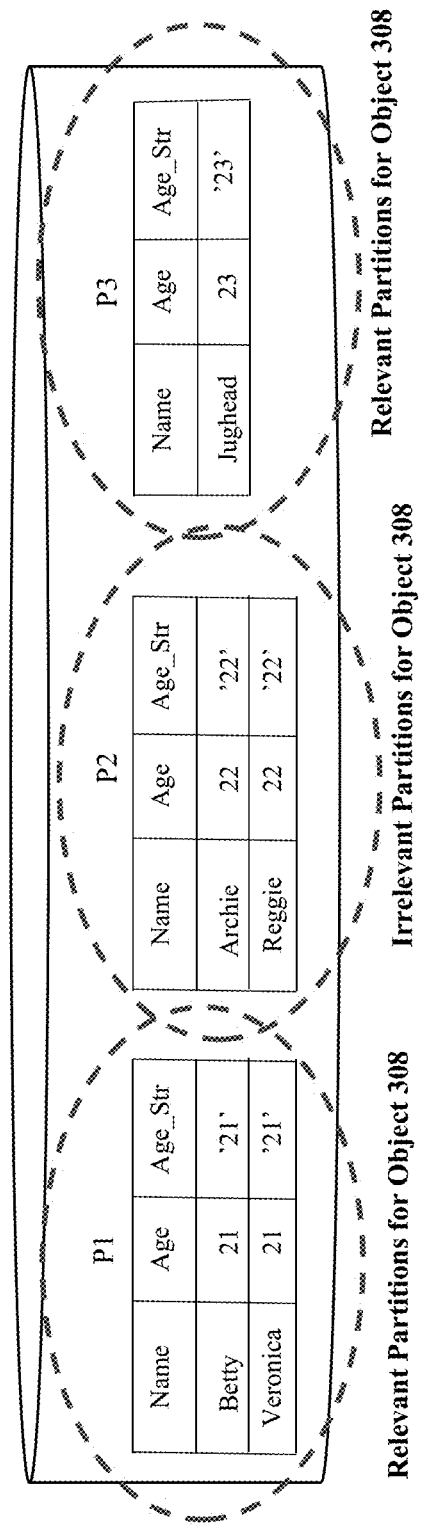

FIG. 7D illustrates the identification of one or more relevant and/or irrelevant partitions for the partition scheme corresponding to metadata object 308. Here, the string value in the "Age_str" column cannot include the value '22'. Therefore, any partition(s) having a partition bound that intersects with this value (partition P2) is considered an irrelevant partition. Any partitions having a partition bound that does not intersect with this value (partitions P1 and P3) are possibly relevant partitions.

Figure 7E:
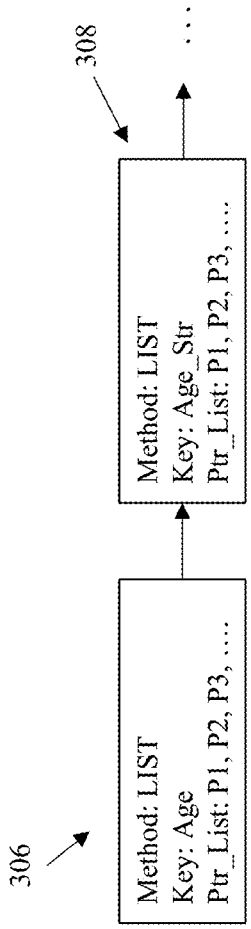
Figure 7E:
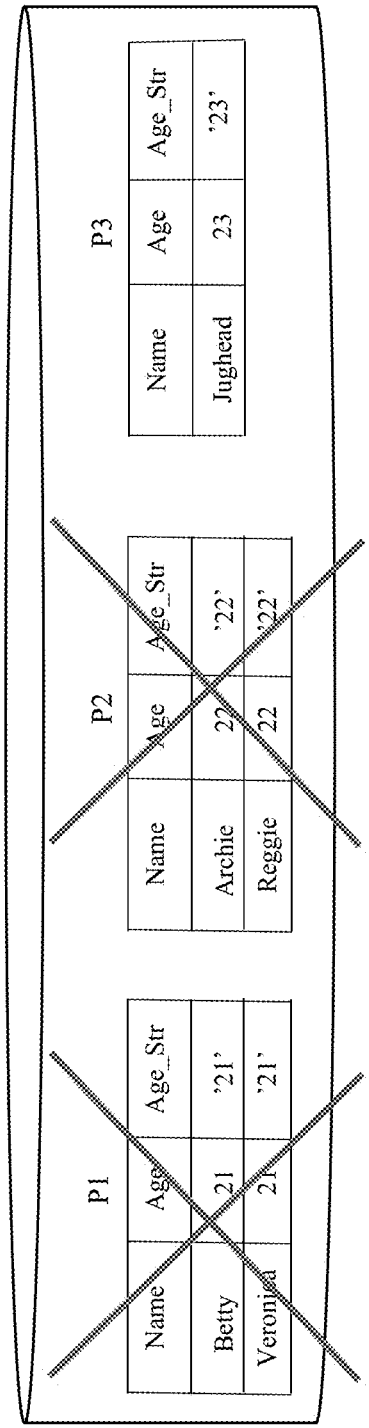

As shown in FIG. 7E, partition pruning may be applied to optimize query processing for query Q3. As noted above, partition P1 has been identified as irrelevant for the predicate condition corresponding to the partition scheme for metadata object 306. In addition, partition P2 has been identified as irrelevant for the predicate condition corresponding to the partition scheme for metadata object 308. For the current query having a Boolean AND joining the two conditions in the predicate, this means that both partitions P1 and P2 should be pruned, since they do not contain any content that would otherwise be returned from processing the database statement. Therefore, these two partitions can be pruned from execution of the query.

Figure 7F:
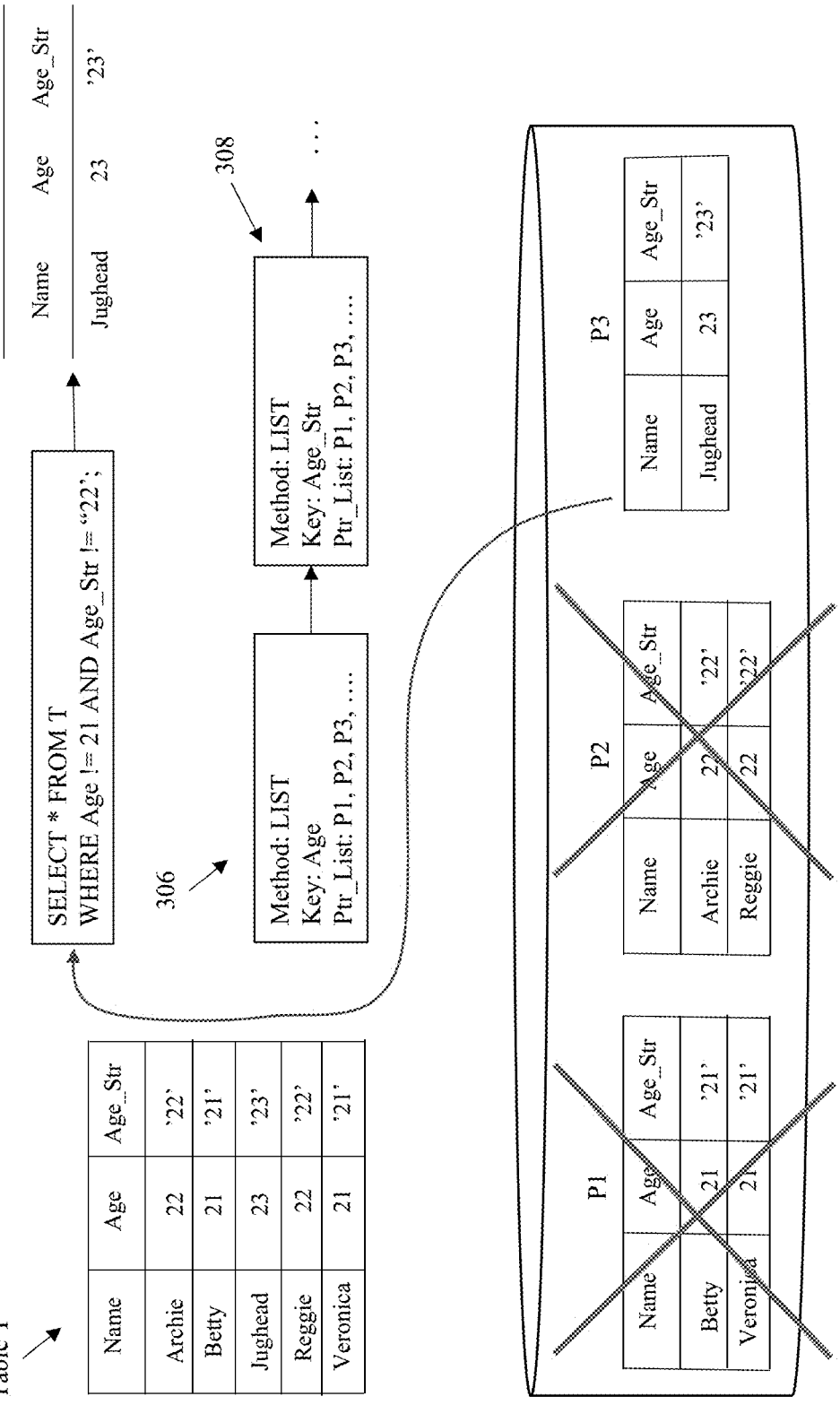

As illustrated in FIG. 7F, the query Q3 can now be processed using the remaining non-pruned partitions. Here, only partition P3 remains after partitions P1 and P2 have been pruned. Therefore, only partition P3 needs to be loaded and processed to execute the query. As such, the query results are generated from processing only the contents of partition P3.

The embodiments of the invention can be applied to any number of different usage scenarios. For example, the invention may be applied to implement multiple partition schemes for database objects within a consolidated database system. A consolidated database refers to the centralizing and sharing of resources for multiple database structures and entities, and is often implemented so that the multiple entities may share a common set of underlying processing and storage resources.

In some systems, virtualization may be employed to implement the consolidated database system. The physical hardware to implement the consolidated database may be shared by multiple virtual machine structures, where the underlying physical servers may host some number of the virtual machines. In addition, the databases themselves may either share or have their own distinct physical hardware, e.g., where each database resides on its own physical server running its own set of virtual machine. This may be implemented to maintain separation between the systems, with each able to run at a different OS and database version if required. The consolidated database may also be implemented using "containers", which may be considered thin versions of virtualization infrastructures, which still provides separation between containers but with less overhead compared to standard virtualization. For example, a single server may be used to implement multiple containers, with each container having with its own database installation.

Figure 8:
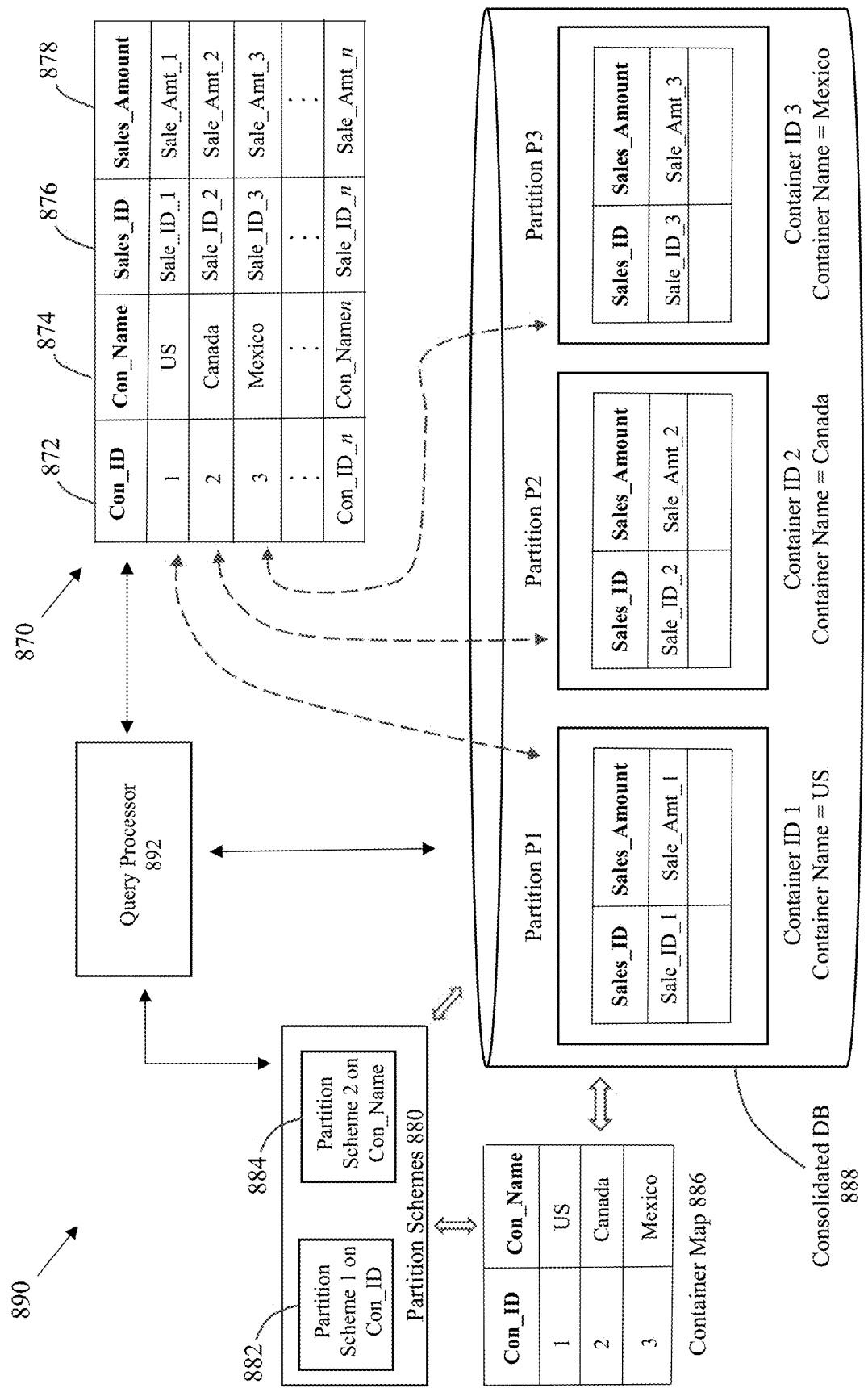
FIG. 8 illustrates a system for implementing some embodiments of the invention for a consolidated database system.

FIG. 8 shows an illustration of a consolidated database system 890 implemented with multiple containers. A container map 886 provides metadata that correlates each container to respective metadata information about that container. As shown in the metadata map 886, a first container corresponds to a container ID value of 1 and the container name value of "US". Similarly, a second container corresponds to a container ID value of 2 and to a container name value of "Canada", while a third container corresponds to a container ID value of 3 and the container name value of "Mexico".

Each container may include its own version of a common database table. Here, the common database table is a Sales table having two columns. A first column holds a sales ID value and a second column holds a sales amount value.

A consolidated view 870 may be presented for the contents within the sales table across all of the containers. The consolidated view 870 includes a row for every pertinent row from among the individual tables within each of the containers. For each row, the consolidated view 870 may include columns 876 and 878 that holds the values for the same columns from the individual tables within the containers. In addition, the consolidated view 870 may include a column 872 that holds the container ID value and container name for a given row. This means, for example, that a first row originating from container 1 would include the value 1 in its container ID column 872 and the value "US" in its container name column 874, a second row originating from container 2 would include the value 2 in its container ID column 872 and the value "Canada" in its container name column 874, and a third row originating from container 3 would include the value 3 in its container ID column 872 and the value "Mexico" in its container name column 874.

From a partitioning point of view, a separate partition may be defined for the contents of each separate container. Therefore, a first partition P1 may be defined for the contents of container 1, a second partition P2 may be defined for the contents of container 2, and a third partition P3 may be defined for the contents of container 3.

In this particular example, it can be seen that multiple partitioning schemes 880 may be established on consolidated view 870 that correlates to these partitions. A first partitioning scheme 882 may be defined having the following properties: (a) partition method being a list partition; (b) partition key on the container ID column 872; and (c) partition bound corresponding to the value 1 for partition P1, value 2 for partition P2, and value 3 for partition P3. A second partitioning scheme 884 may be defined having the following properties: (a) partition method being a list partition; (b) partition key on the container name column 874; and (c) partition bound corresponding to the value "US" for partition P1, value "Canada" for partition P2, and value "Mexico" for partition P3. The partition scheme metadata information may be implemented, for example, using the metadata linked list structure described above.

In operation, the consolidated database system 890 may receive database statements for execution against consolidated view 870. A query processor 892 may process, optimize, and execute the database statement according to any of the partition schemes 880 that may be relevant to the statement. For example, a query that includes a predicate condition on the container ID column 872 may be optimized by performing partition-based optimization (e.g., partition pruning) according to partition scheme 882. As another example, a query that includes a predicate condition on the container name column 874 may be optimized by performing partition-based optimization according to partition scheme 884. A query that has a predicate condition corresponding to both columns 872 and 874 may implement partition-based optimization according to both partition schemes 882 and 884.

It is noted that the individual table within the container may have its own container-level partitioning applied to that table. For example, the Sales table may be created at a given container using the following statement:

```
CREATE TABLE Sales ( sale_id INTEGER, sales_amount
NUMBER(10))
PARTITION BY RANGE ( sales_amount )
(PARTITION part_0 VALUES LESS THAN (101) TABLESPACE
  TS0,
 PARTITION part_1 VALUES LESS THAN (1001) TABLESPACE
  TS1,
 PARTITION part_2 VALUES LESS THAN (2001) TABLESPACE
  TS2
);
```

This statement creates three partitions part_0, part_1, and part_2 for the information logically contained in the Sales table at the container, where partition part_0 contains all rows in the Sales Table which has a sales_amount value less than $101, partition part_1 contains all rows having a sales_amount value from $101 to $1000, and partition part_2 contains all rows having a sales_amount value from $1001 to $2000.

In this situation, recursive SQL processing may be applied to perform multiple levels of partition pruning/partition-based optimization to process a given query. At the level of the consolidated view 870, the multiple partition schemes 880 are reviewed to identify a relevant partition scheme, and a first level of partition pruning is applied to prune one of the partitions P1, P2, or P3 based at least upon the relevant partition scheme. Once the relevant partitions P1, P2, and/or P3 are identified, each of these partitions are individually processed with a second level of partition pruning, based upon identification of the relevant/irrelevant partitions part_0, part_1, and/or part_2 at the individual table being processed.

Therefore, what has been described is an improved approach to implement partitioning where multiple partition schemes may be applied to a single database object. Each scheme represents the same set of partitions, but the schemes may have different partition methods, different partition keys, and/or different partition bounds. This approach therefore significantly improves database performance by allowing partition-related performance optimizations to occur using multiple types of partition schemes.

System Architecture Overview

Figure 9:
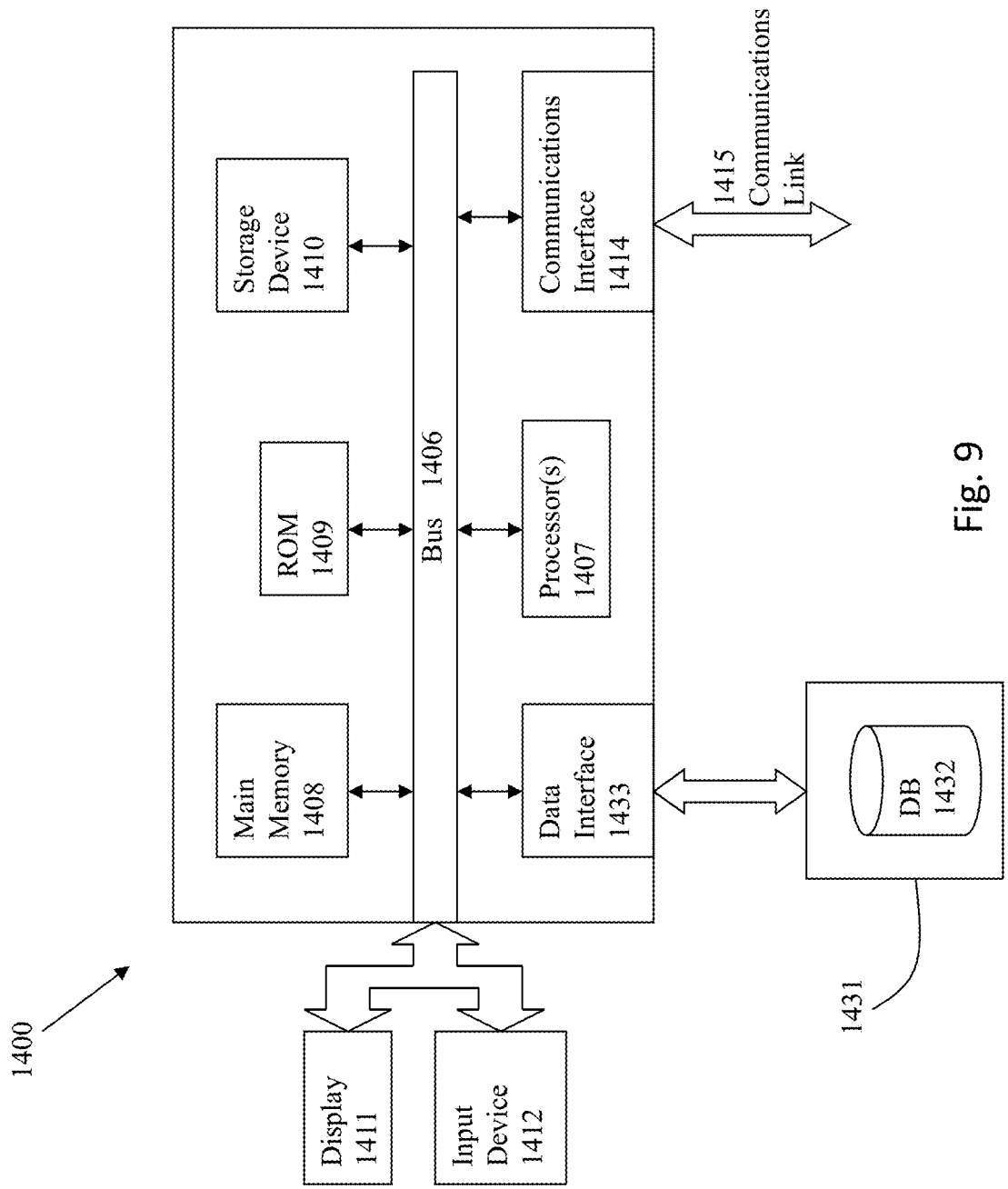
FIG. 9 is a block diagram of an illustrative computing system suitable for implementing an embodiment of the present invention.

FIG. 9 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Data may be accessed from a database 1432 that is maintained in a storage device 1431, which is accessed using data interface 1433.

Figure 10:
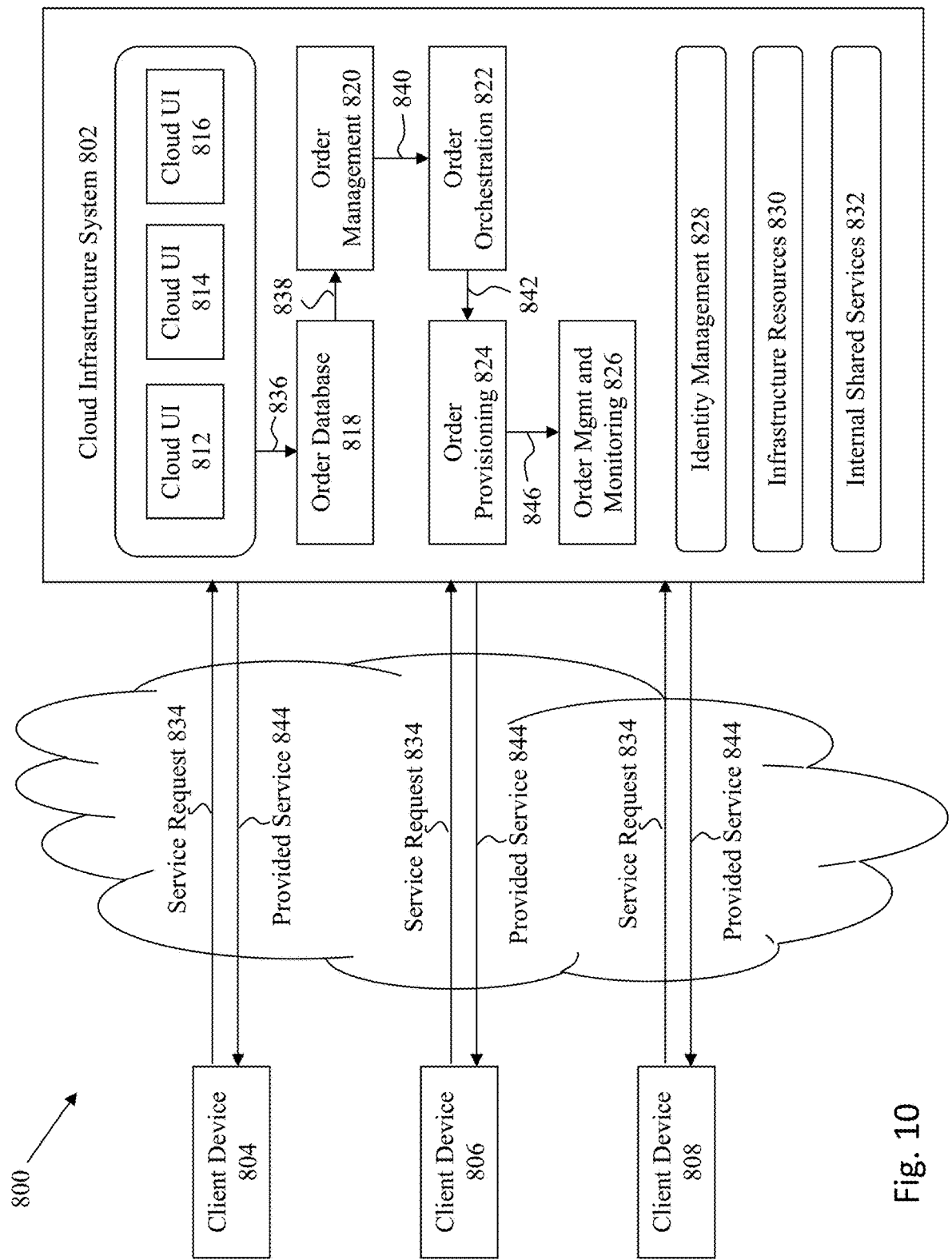
FIG. 10 is a block diagram of one or more components of a system environment in which services may be offered as cloud services, in accordance with an embodiment of the present invention.

FIG. 10 is a simplified block diagram of one or more components of a system environment 800 by which services provided by one or more components of an embodiment system may be offered as cloud services, in accordance with an embodiment of the present disclosure. In the illustrated embodiment, system environment 800 includes one or more client computing devices 804, 806, and 808 that may be used by users to interact with a cloud infrastructure system 802 that provides cloud services. The client computing devices may be configured to operate a client application such as a web browser, a proprietary client application, or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the embodiment shown in the figure is only one example of a cloud infrastructure system that may incorporate an embodiment of the invention. In some other embodiments, cloud infrastructure system 802 may have more or fewer components than shown in the figure, may combine two or more components, or may have a different configuration or arrangement of components. Client computing devices 804, 806, and 808 may be devices similar to those described above for FIG. 9. Although system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols. Cloud infrastructure system 802 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner.

In various embodiments, cloud infrastructure system 802 may be adapted to automatically provision, manage and track a customer's subscription to services offered by cloud infrastructure system 802. Cloud infrastructure system 802 may provide the cloudservices via different deployment models. For example, services may be provided under a public cloud model in which cloud infrastructure system 802 is owned by an organization selling cloud services and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloudservices may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform.

In some embodiments, resources in cloud infrastructure system 802 may be shared by multiple users and dynamically re-allocated per demand. Additionally, resources may be allocated to users in different time zones. For example, cloud infrastructure system 830 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In operation 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

After an order has been placed by the customer, the order information is received via the cloud UIs, 812, 814 and/or 816. At operation 836, the order is stored in order database 818. Order database 818 can be one of several databases operated by cloud infrastructure system 818 and operated in conjunction with other system elements. At operation 838, the order information is forwarded to an order management module 820. In some instances, order management module 820 may be configured to perform billing and accounting functions related to the order, such as verifying the order, and upon verification, booking the order. At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain embodiments, order orchestration module 822 enables the management of business processes associated with each order and applies business logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 enables the allocation of resources for the services ordered by the customer. Order provisioning module 824 provides a level of abstraction between the cloud services provided by cloud infrastructure system 802 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client devices 804, 806 and/or 808 by order provisioning module 824 of cloud infrastructure system 802.

At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain embodiments, cloud infrastructure system 802 may include an identity management module 828. Identity management module 828 may be configured to provide identity services, such as access management and authorization services in cloud infrastructure system 802. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

What is claimed is:

1. A method for implementing a partitioned database system, comprising:

identifying a single database object within a database system;

storing contents for the single database object in a plurality of partitions according to a first partition scheme for the single database object, the first partition scheme corresponding to a first combination of a partitioning method, a partition key, and a partition bound;

defining a second partition scheme for the single database object, the second partition scheme corresponding to a second combination of the partitioning method, the partition key, and the partition bound, the first and second partition schemes being different, wherein metadata for the second partition scheme references one or more partitions of the plurality of partitions of the single database;

receiving a database statement that operates upon the single database object; and processing the database statement upon the single database object by using at least one of the first partition scheme or the second partition scheme to implement partition-based optimization.

2. The method of claim 1, wherein the partition-based optimization is implemented using both the first partition scheme and the second partition scheme.

3. The method of claim 1, wherein the partition-based optimization corresponds to at least one of partition pruning, partition-wise join, group by pushdown, order by pushdown, slave mapping during query optimization, code generation, or partition-specific database management.

4. The method of claim 1, wherein the partition-based optimization is implemented by identifying a matching partition scheme, wherein a predicate in the database statement is compared to the partition key to identify the matching partition scheme.

5. The method of claim 1, wherein a metadata structure is constructed to track partition schemes, the metadata structure comprising a linked list of objects, each object within the linked list of objects comprising a first portion corresponding to the partitioning method, a second portion corresponding to the partition key, and a third portion corresponding to a list of the plurality of partitions.

6. The method of claim 1, wherein the database system corresponds to a consolidated database system, a first key for the first partition scheme corresponds to a container ID, and a second key for the second partition scheme corresponds to a container name.

7. The method of claim 1, in which a set of data within a partition is subject to additional partitioning, and recursive processing is performed that applies a second level of partition-based optimization to the additional partitioning.

8. A system for implementing a partitioned database system, comprising:

a processor;

a memory for holding programmable code; and wherein the programmable code includes instructions executable by the processor for identifying a single database object within a database system, storing contents for the single database object in a plurality of partitions according to a first partition scheme for the single database object, the first partition scheme corresponding to a first combination of a partitioning method, a partition key, and a partition bound, defining a second partition scheme for the single database object, the second partition scheme corresponding to a second combination of the partitioning method, the partition key, and the partition bound, the first and second partition schemes being different, wherein metadata for the second partition scheme references one or more partitions of the plurality of partitions of the single database, receiving a database statement that operates upon the single database object, and processing the database statement upon the single database object by using at least one of the first partition scheme or the second partition scheme to implement partition-based optimization.

9. The system of claim 8, wherein the partition-based optimization is implemented using both the first partition scheme and the second partition scheme.

10. The system of claim 8, wherein the partition-based optimization corresponds to at least one of partition pruning, partition-wise join, group by pushdown, order by pushdown, slave mapping during query optimization, code generation, or partition-specific database management.

11. The system of claim 8, wherein the partition-based optimization is implemented by identifying a matching partition scheme, wherein a predicate in the database statement is compared to the partition key to identify the matching partition scheme.

12. The system of claim 8, wherein a metadata structure is constructed to track partition schemes, the metadata structure comprising a linked list of objects, each object within the linked list of objects comprising a first portion corresponding to the partitioning method, a second portion corresponding to the partition key, and a third portion corresponding to a list of the plurality of partitions.

13. The system of claim 8, wherein the database system corresponds to a consolidated database system, a first key for the first partition scheme corresponds to a container ID, and a second key for the second partition scheme corresponds to a container name.

14. The system of claim 8, in which a set of data within a partition is subject to additional partitioning, and recursive processing is performed that applies a second level of partition-based optimization to the additional partitioning.

15. A computer program product embodied on a computer readable medium, the computer readable medium having stored thereon a sequence of instructions which, when executed by a processor, executes a method for implementing a partitioned database system comprising:

identifying a single database object within a database system;

storing contents for the single database object in a plurality of partitions according to a first partition scheme for the single database object, the first partition scheme corresponding to a first combination of a partitioning method, a partition key, and a partition bound;

defining a second partition scheme for the single database object, the second partition scheme corresponding to a second combination of the partitioning method, the partition key, and the partition bound, the first and second partition schemes being different, wherein metadata for the second partition scheme references one or more partitions of the plurality of partitions of the single database;

receiving a database statement that operates upon the single database object; and processing the database statement upon the single database object by using at least one of the first partition scheme or the second partition scheme to implement partition-based optimization.

16. The computer program product of claim 15, wherein the partition-based optimization is implemented using both the first partition scheme and the second partition scheme.

17. The computer program product of claim 15, wherein the partition-based optimization corresponds to at least one of partition pruning, partition-wise join, group by pushdown, order by pushdown, slave mapping during query optimization, code generation, or partition-specific database management.

18. The computer program product of claim 15, wherein the partition-based optimization is implemented by identifying a matching partition scheme, wherein a predicate in the database statement is compared to the partition key to identify the matching partition scheme.

19. The computer program product of claim 15, wherein a metadata structure is constructed to track partition schemes, the metadata structure comprising a linked list of objects, each object within the linked list of objects comprising a first portion corresponding to the partitioning method, a second portion corresponding to the partition key, and a third portion corresponding to a list of the plurality of partitions.

20. The computer program product of claim 15, wherein the database system corresponds to a consolidated database system, a first key for the first partition scheme corresponds to a container ID, and a second key for the second partition scheme corresponds to a container name.

21. The computer program product of claim 15, in which a set of data within a partition is subject to additional partitioning, and recursive processing is performed that applies a second level of partition-based optimization to the additional partitioning.

* * * * *